(12) United States Patent
Kondo et al.

(10) Patent No.: US 6,621,936 B1
(45) Date of Patent: Sep. 16, 2003

(54) METHOD AND APPARATUS FOR SPATIAL CLASS REDUCTION

(75) Inventors: Tetsujiro Kondo, Kanagawa (JP); Yasuhiro Fujimori, Cupertino, CA (US); Sugata Ghosal, San Jose, CA (US); James J. Carrig, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/250,062

(22) Filed: Feb. 12, 1999

(51) Int. Cl.$^7$ ................................................. G06K 9/40
(52) U.S. Cl. ........................ 382/260; 382/261; 382/275; 348/607
(58) Field of Search ................................. 382/254, 260, 382/261, 275, 263, 264, 266, 269, 232, 236, 238, 239; 702/190, 191, 194; 348/607

(56) References Cited

U.S. PATENT DOCUMENTS

| | | |
|---|---|---|
| 3,311,879 A | 3/1967 | Daher |
| 3,805,232 A | 4/1974 | Allen |
| 4,361,853 A | 11/1982 | Remy et al. |

(List continued on next page.)

FOREIGN PATENT DOCUMENTS

| | | | |
|---|---|---|---|
| EP | 0 398 741 A | 11/1990 | |
| EP | 0 527 611 | 8/1992 | ............ H04N/9/80 |
| EP | 0 558 016 | 2/1993 | .......... H04N/7/133 |
| EP | 0 566 412 A2 | 4/1993 | |
| EP | 0 571 180 A2 | 5/1993 | |
| EP | 0 592 196 A2 | 10/1993 | |
| EP | 0 596 826 | 11/1993 | ............ H04N/5/92 |
| EP | 0 605 209 A2 | 12/1993 | |
| EP | 0 610 587 | 12/1993 | |
| EP | 0 592 196 A2 | 4/1994 | |
| EP | 0 597 576 A | 5/1994 | |
| EP | 0 651 584 A2 | 10/1994 | |
| EP | 0 680 209 | 4/1995 | ............ H04N/5/91 |
| EP | 0 746 157 A2 | 5/1996 | |
| EP | 0 833 517 | 4/1998 | ............ H04N/7/30 |
| GB | 2 280 812 A | 2/1995 | |
| GB | 2 320 836 A | 11/1997 | |

(List continued on next page.)

OTHER PUBLICATIONS

Robert, P., << Motion Compensation Interpolation Considering Occluding, Appearing and Disappearing Areas, Signal Processing of HDTV, 3. Turin, Sep. 4–6, 1991, Proceedings of the International Workshop on HDTV and Beyond, Amsterdam, Elsevier, NL, vol. Workshop 4, Sep. 4, 1991, pp. 329–341.

Ozkan, M.K., et al. Adaptive Motion–Compensated Filtering Of Noisy Image Sequences; IEEE Transactions on P. 277–290. Aug. 1993 vol. 3, Issue 4.

Sezan, et al. "Temporally Adaptive Filtering Of Noisy Image Sequences Using A Robust Motion Estimation Algorithm"; 1991 International Conference on p. 2429–2432 vol. 4, Apr. 14–17, 1991.

(List continued on next page.)

*Primary Examiner*—Thomas D. Lee
(74) *Attorney, Agent, or Firm*—Blakely, Sokoloff, Taylor & Zafman LLP

(57) ABSTRACT

A method, apparatus, and article of manufacture for restoring a deteriorated signal to an undeteriorated signal. A deteriorated signal consists of a plurality of deteriorated and undeteriorated data points. For each deteriorated data point, a plurality of class types is created based upon characteristics of the area containing the deteriorated data point. The data point is classified with respect to one of the plurality of class types and assigned a corresponding input signal class. The undeteriorated signal is generated by adaptively filtering the deteriorated input signal in accordance with the input signal classification result. More than one classification method is used to create the plurality of class types. Created classes may include a motion class, an error class, a spatial class or a spatial activity class. A spatial class is modified according to a spatial symmetry.

92 Claims, 20 Drawing Sheets

U.S. PATENT DOCUMENTS

| | | |
|---|---|---|
| 4,381,519 A | 4/1983 | Wilkinson et al. |
| 4,419,693 A | 12/1983 | Wilkinson et al. |
| 4,438,438 A | 3/1984 | Arens et al. |
| 4,532,628 A | 7/1985 | Matthews |
| 4,574,393 A | 3/1986 | Blackwell et al. |
| 4,586,082 A | 4/1986 | Wilkinson |
| 4,656,514 A | 4/1987 | Wilkinson et al. |
| 4,675,735 A | 6/1987 | Wilkinson et al. |
| 4,703,351 A | 10/1987 | Kondo |
| 4,703,352 A | 10/1987 | Kondo |
| 4,710,811 A | 12/1987 | Kondo |
| 4,722,003 A | 1/1988 | Kondo |
| 4,729,021 A | 3/1988 | Kondo |
| 4,772,947 A | 9/1988 | Kono |
| 4,788,589 A | 11/1988 | Kondo |
| 4,807,033 A | 2/1989 | Keesen et al. |
| 4,815,078 A | 3/1989 | Shimura .................... 370/30 |
| 4,845,560 A | 7/1989 | Kondo et al. |
| 4,890,161 A | 12/1989 | Kondo |
| 4,924,310 A | 5/1990 | Von Brandt |
| 4,953,023 A | 8/1990 | Kondo |
| 4,975,915 A | 12/1990 | Sako et al. |
| 5,023,710 A | 6/1991 | Kondo et al. |
| 5,043,810 A | 8/1991 | Vreeswijk et al. |
| 5,086,489 A | 2/1992 | Shimura |
| 5,093,872 A | 3/1992 | Tutt |
| 5,101,446 A | 3/1992 | Resnikoff et al. |
| 5,122,873 A | 6/1992 | Golin |
| 5,134,479 A | 7/1992 | Ohishi |
| 5,142,537 A | 8/1992 | Kutner et al. |
| 5,150,210 A | 9/1992 | Hoshi et al. |
| 5,159,452 A | 10/1992 | Kinoshita et al. ........... 358/141 |
| 5,166,987 A | 11/1992 | Kageyama |
| 5,177,797 A | 1/1993 | Takenaka et al. |
| 5,185,746 A | 2/1993 | Tanaka et al. |
| 5,196,931 A | 3/1993 | Kondo |
| 5,208,816 A | 5/1993 | Seshardi et al. ............. 371/43 |
| 5,237,424 A | 8/1993 | Nishino et al. |
| 5,241,381 A | 8/1993 | Kondo |
| 5,243,428 A | 9/1993 | Challapali et al. |
| 5,247,363 A | 9/1993 | Sun et al. |
| 5,258,835 A | 11/1993 | Kato |
| 5,307,175 A | 4/1994 | Seachman |
| 5,327,502 A | 7/1994 | Katata et al. ................. 382/56 |
| 5,337,087 A | 8/1994 | Mishima |
| 5,359,694 A | 10/1994 | Concordel .................. 358/445 |
| 5,379,072 A | 1/1995 | Kondo |
| 5,398,078 A | 3/1995 | Masuda et al. ............. 348/699 |
| 5,400,076 A | 3/1995 | Iwamura |
| 5,406,334 A | 4/1995 | Kondo et al. |
| 5,416,651 A | 5/1995 | Uetake et al. |
| 5,416,847 A | 5/1995 | Boze |
| 5,428,403 A | 6/1995 | Andrew et al. |
| 5,434,716 A | 7/1995 | Sugiyama et al. |
| 5,438,369 A | 8/1995 | Citta et al. |
| 5,446,456 A | 8/1995 | Seo |
| 5,455,629 A | 10/1995 | Sun et al. |
| 5,469,216 A | 11/1995 | Takahashi et al. |
| 5,469,474 A | 11/1995 | Kitabatake |
| 5,471,501 A | 11/1995 | Parr et al. ................... 375/354 |
| 5,473,479 A | 12/1995 | Takakura |
| 5,481,554 A | 1/1996 | Kondo |
| 5,481,627 A | 1/1996 | Kim ........................... 382/254 |
| 5,495,298 A | 2/1996 | Uchida et al. |
| 5,499,057 A | 3/1996 | Kondo et al. |
| 5,528,608 A | 6/1996 | Shimizume |
| 5,546,130 A | 8/1996 | Hackett et al. |
| 5,557,420 A | 9/1996 | Yanagihara et al. |
| 5,557,479 A | 9/1996 | Yanagihara |
| 5,568,196 A | 10/1996 | Hamada et al. |
| 5,577,053 A | 11/1996 | Dent |
| 5,579,051 A | 11/1996 | Murakami et al. |
| 5,594,807 A | 1/1997 | Liu |
| 5,598,214 A | 1/1997 | Kondo et al. ............... 348/414 |
| 5,617,135 A | 4/1997 | Noda et al. |
| 5,617,333 A | 4/1997 | Oyamada et al. |
| 5,625,715 A | 4/1997 | Trew et al. |
| 5,636,316 A | 6/1997 | Oku et al. |
| 5,649,053 A | 7/1997 | Kim |
| 5,663,764 A | 9/1997 | Kondo et al. ............... 348/414 |
| 5,671,018 A | 9/1997 | Ohara et al. |
| 5,673,357 A | 9/1997 | Shima |
| 5,677,734 A | 10/1997 | Oikawa et al. |
| 5,689,302 A | 11/1997 | Jones |
| 5,699,475 A | 12/1997 | Oguro et al. |
| 5,703,889 A | 12/1997 | Shimoda et al. .............. 371/55 |
| 5,724,099 A | 3/1998 | Hamdi et al. |
| 5,724,369 A | 3/1998 | Brailean et al. |
| 5,737,022 A | 4/1998 | Yamaguchi et al. |
| 5,751,361 A | 5/1998 | Kim |
| 5,751,743 A | 5/1998 | Takizawa .................... 371/41 |
| 5,751,862 A | 5/1998 | Williams et al. |
| 5,778,097 A | 7/1998 | Nickerson |
| 5,786,857 A | 7/1998 | Yamaguchi |
| 5,790,195 A | 8/1998 | Ohsawa |
| 5,796,786 A | 8/1998 | Lee ............................. 375/326 |
| 5,805,762 A | 9/1998 | Boyce et al. |
| 5,809,041 A | 9/1998 | Shikakura et al. |
| 5,809,231 A | 9/1998 | Yokoyama et al. |
| 5,841,477 A | * 11/1998 | Kim ........................... 382/254 |
| 5,852,470 A | 12/1998 | Kondo et al. ............... 348/448 |
| 5,861,922 A | 1/1999 | Murashita et al. |
| 5,878,183 A | 3/1999 | Sugiyama et al. |
| 5,883,983 A | 3/1999 | Lee et al. |
| 5,894,526 A | 4/1999 | Watanabe et al. |
| 5,903,481 A | 5/1999 | Kondo et al. |
| 5,903,672 A | 5/1999 | Yu |
| 5,928,318 A | 7/1999 | Araki |
| 5,936,674 A | 8/1999 | Kim |
| 5,940,539 A | 8/1999 | Kondo et al. |
| 5,946,044 A | 8/1999 | Kondo et al. |
| 5,991,447 A | 11/1999 | Eifrig et al. |
| 6,018,317 A | 1/2000 | Dogan et al. |
| 6,067,636 A | 5/2000 | Yao et al. |
| 6,104,434 A | 8/2000 | Nakagawa et al. |
| 6,137,915 A | 10/2000 | Chai |
| 6,151,416 A | 11/2000 | Kondo et al. |
| 6,164,540 A | 12/2000 | Bridgelall et al. |
| 6,192,079 B1 | 2/2001 | Sharma et al. |
| 6,192,161 B1 | 2/2001 | Kondo et al. |

FOREIGN PATENT DOCUMENTS

| | | | |
|---|---|---|---|
| JP | 7-67028 | 3/1995 | .......... H04N/5/235 |
| WO | WO96/07987 | 9/1995 | |
| WO | WO 97/46019 | 12/1997 | |
| WO | WO99/21285 | 10/1998 | |
| WO | 99 21090 A | 4/1999 | |
| WO | WO 00/48126 | 8/2000 | |

OTHER PUBLICATIONS

Crinon, R.J., et al. "Adaptive Model–Based Motion Estimation"; IEEE Transactions on p. 469–481, vol. 3, Issue 5, Sep. 1994.

Wollborn, M. Prototype Prediction For Colour Update In Object–Based Analysis–Synthesis Coding; IEEE Transactions on p. 236–245, vol. 4, No. 3, Jun. 1994.

Patti, A.J., et al., Robust Methods For High–Quality Stills From Interlaced Video In the Presence Of Dominant Motion; IEEE Transactions on p. 328–342, vol. 7, No. 2, Apr. 1997.

International Search Report PCT/00/25223, 7 pages, Dec. 7, 2000.

Meguro, et al., "An Adaptive Order Statistics Filter Based On Fuzzy Rules For Image Processing", p. 70–80, © 1997 Scripta Technica, Inc.

International Search Report PCT/US00/23035, 5 pgs., Jan. 22, 2001.

International Search Report PCT/US00/03743, 4 pgs., Feb. 11, 2000.

International Search Report PCT/US00/03439, Feb. 9, 2000, 8 pgs.

International Search Report PCT/US00/03595, Feb. 10, 2000, 6 pgs.

International Search Report PCT/US00/03611, Feb. 10, 2000, 8 pgs.

International Search Report PCT/US00/03599, Feb. 10, 2000, 4 pgs.

International Search Report PCT/US00/03742, Feb. 11, 2000, 5 pgs.

International Search Report PCT/US00/03654, Feb. 10, 2000, 4 pgs.

International Search Report PCT/US00/03299, Feb. 9, 2000, 5 pgs.

Meguro, et al., "An Adaptive Order Statistics Filter Based On Fuzzy Rules For Image Processing", pp. 70–80, XP-00755627, 1997 Scripta Texhnica, Inc.

Jeng, et al., "Concealment Of Bit Error And Cell Loss In Inter–Frame Coded Video Transmission", 1991 IEEE, 17.4.1–17.4.5.

Monet, et al., "Block Adaptive Quantization Of Images", IEEE 1993, pp. 303–306.

International Search Report PCT/US00/03738, Feb. 11, 2000, 9 pgs.

Stammnitz, et al., "Digital HDTV Experimental System", pp. 535–542.

International Search Report PCT/US00/03508, Feb, 9, 2000, 8 pgs.

Chu, et al., Detection and Concealment of Transmission Errors in H.261 Images, XP–000737027, pp. 74–84, IEEE transactions, Feb. 1998.

Park, et al., "Recovery of Block–coded Images from Channel Errors", pp. 396–400, pub. Date May 23, 1993.

Japanese Patent No. 05304659 and translation of Abstract.
Japanese Patent No. 05244578 and translation of Abstract.
Japanese Patent No. 05300485 and translation of Abstract.
Japanese Patent No. 06070298 and translation of Abstract.
Japanese Patent No. 06006778 and translation of Abstract.
Japanese Patent No. 06113256 and translation of Abstract.
Japanese Patent No. 06113275 and translation of Abstract.
Japanese Patent No. 06253287 and translation of Abstract.
Japanese Patent No. 06253280 and translation of Abstract.
Japanese Patent No. 06253284 and translation of Abstract.
Japanese Patent No. 06350981 and translation of Abstract.
Japanese Patent No. 06350982 and translation of Abstract.
Japanese Patent No. 08317394 and translation of Abstract.
Japanese Patent No. 07023388 and translation of Abstract.
Japanese Patent No. 04245881 and translation of Abstract.
Japanese Patent No. 04115628 and translation of Abstract.
Japanese Patent No. 04115686 and translation of Abstract.
Translation of Abstract of Japanese Patent No. 61147690.
Translation of Abstract of Japanese Patent No. 63256080.
Translation of Abstract of Japanese Patent No. 63257390.
Translation of Abstract of Japanese Patent No. 02194785.
Translation of Abstract of Japanese Patent No. 03024885.
Translation of Abstract of Japanese Patent No. 04037293.
Translation of Abstract of Japanese Patent No. 04316293.
Translation of Abstract of Japanese Patent No. 04329088.
Translation of Abstract of Japanese Patent No. 05047116.
Translation of Abstract of Japanese Patent No. 05244579.
Translation of Abstract of Japanese Patent No. 05244580.
Translation of Abstract of Japanese Patent No. 05244559.
Translation of Abstract of Japanese Patent No. 05304659.
Translation of Abstract of Japanese Patent No. 06086259.
Translation of Abstract of Japanese Patent No. 06113258.
Translation of Abstract of Japanese Patent No. 06125534.
Translation of Abstract of Japanese Patent No. 06162693.
Translation of Abstract of Japanese Patent No. 06253287.
Translation of Abstract of Japanese Patent No. 06253280.
Translation of Abstract of Japanese Patent No. 06253284.
Translation of Abstract of Japanese Patent No. 07046604.
Translation of Abstract of Japanese Patent No. 07085611.
Translation of Abstract of Japanese Patent No. 07095581.
Translation of Abstract of Japanese Patent No. 07177505.
Translation of Abstract of Japanese Patent No. 07177506.
Translation of Abstract of Japanese Patent No. 07240903.

R. C. Gonzalez, et al., "Digital Image Processing", Addison Wesley Publishing Company, Inc., 1992, pp. 346–348.

R. Aravind, et al., "Image and Video Coding Standards", AT&T Technical Journal, Jan./Feb. 1993, pp. 67–88.

Zhu, et al., "Coding and Cell–Loss Recovery in DCT–Based Packet Video", IEEE Transactions on Circuits and Systems for Video Technology, Jun. 3, 1993, No. 3, NY.

International Search Report, PCT/US98/22347, Mar. 16, 1999, 2 pgs.

International Search Report, PCT/US95/22531, Apr. 1, 1999, 1 pgs.

International Search Report, PCT/US98/22411, Feb. 25, 1999, 1 pgs.

International Search Report, PCT/US98/22412, Oct. 5, 1999, 5 pgs.

Kondo, et al., "Adaptive Dynamic Range Coding Scheme for Future HDTV Digital VTR", Fourth International Workshop on HDTV and Beyond, Sep. 4–6, Turin, Italy.

Kondo, et al., "A New Concealment Method for Digital VCR's", IEEE Visual Signal Processing and Communication, pp. 20–22, 9/93, Melbourne, Australia.

Park, et al., "A Simple Concealment for ATM Bursty Cell Loss", IEEE Transactions on Consumer Electronics, No. 3, Aug. 1993, pp. 704–709.

Tom, et al., "Packet Video for Cell Loss Protection Using Deinterleaving and Scrambling", ICASSP 91: 1991 International Conference on Acoustics, Speech and Signal Processing, vol. 4, pp. 2857–2860, Apr. 1991.

NHK Laboratories Note, "Error Correction, Concealment and Shuffling", No. 424, Mar. 1994, pp. 29–44.

Translation of Japanese Patent #7–67028, 30 pgs.

Kondo, et al., "Adaptive Dynamic Range Coding Scheme for Future Consumer Digital VTR", pp. 219–226.

Kim, et al., "Bit Rate Reduction Algorithm for a Digital VCR", IEEE Transactions on Consumer Electronics, vol. 37, No. 3, Aug. 1, 1992, pp. 267–274.

* cited by examiner

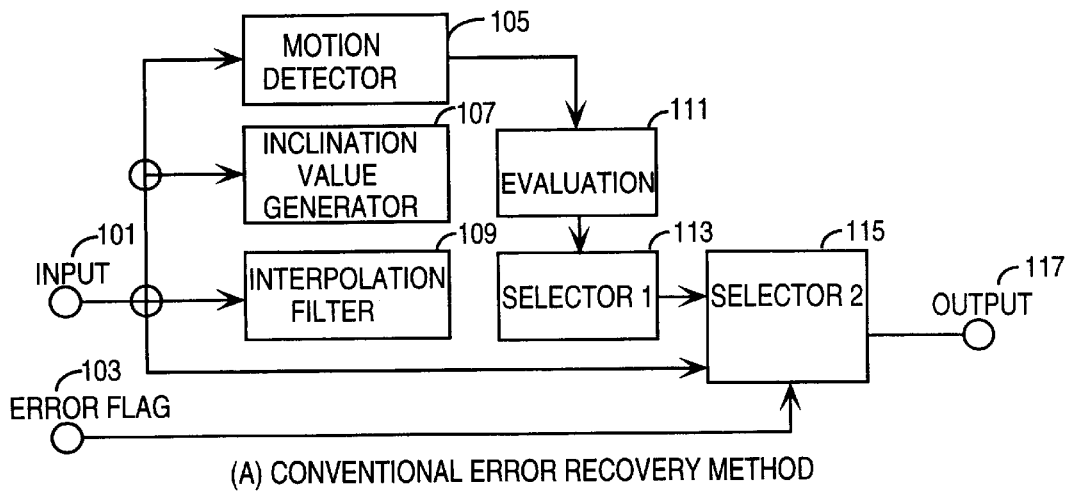
(A) CONVENTIONAL ERROR RECOVERY METHOD
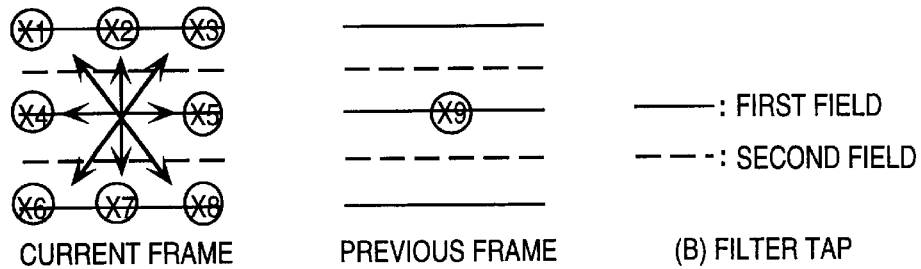
————— : FIRST FIELD
— — — : SECOND FIELD
CURRENT FRAME     PREVIOUS FRAME     (B) FILTER TAP
INCLINATION VALUE EI:
MOTION AREA:   $E1 = |X1-X8|$   ⟶   $Y1 + (X1=X8)/2$
                  $E2 = |X2-X7|$   ⟶   $Y2 + (X2=X7)/2$
                  $E3 = |X3-X6|$   ⟶   $Y3 + (X3=X6)/2$
                  $E4 = |X4-X5|$   ⟶   $Y4 + (X4=X5)/2$
STATIONARY AREA   ⟶   $Y5 = X9$
(C) CORRESPONDENCE BETWEEN INCLINATION VALUE AND INTERPOLATION FILTER
FIGURE 1: CONVENTIONAL ERROR RECOVERY METHOD

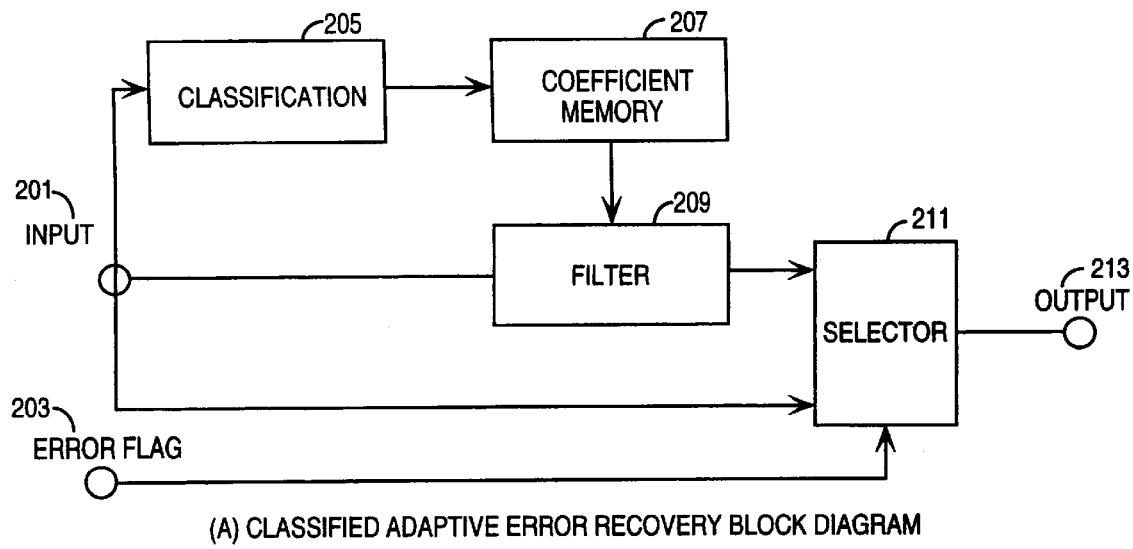
(A) CLASSIFIED ADAPTIVE ERROR RECOVERY BLOCK DIAGRAM
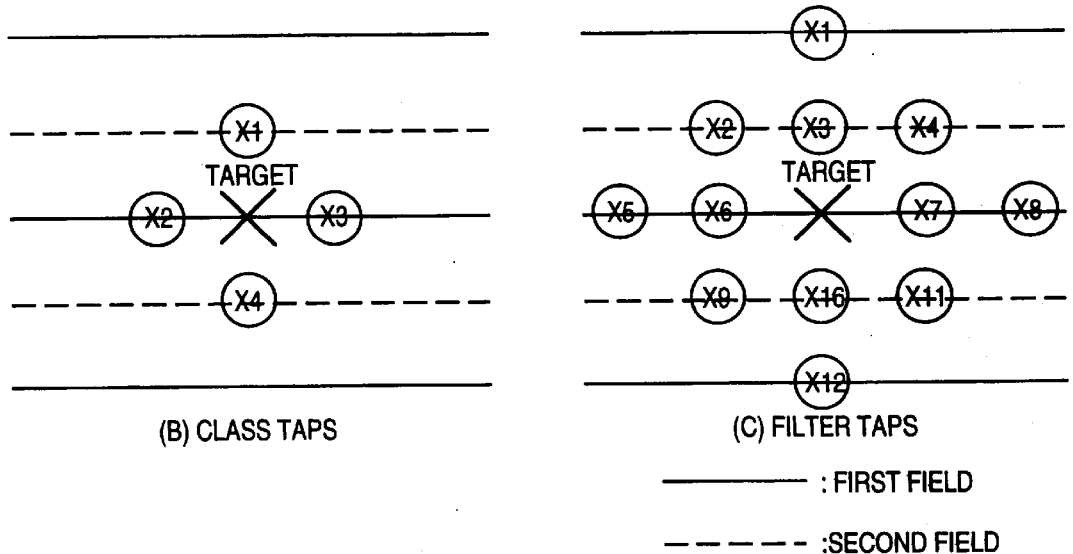
(B) CLASS TAPS  (C) FILTER TAPS
——— : FIRST FIELD
– – – – – :SECOND FIELD
FIGURE 2 : CLASSIFIED ADAPTIVE ERROR RECOVERY METHOD

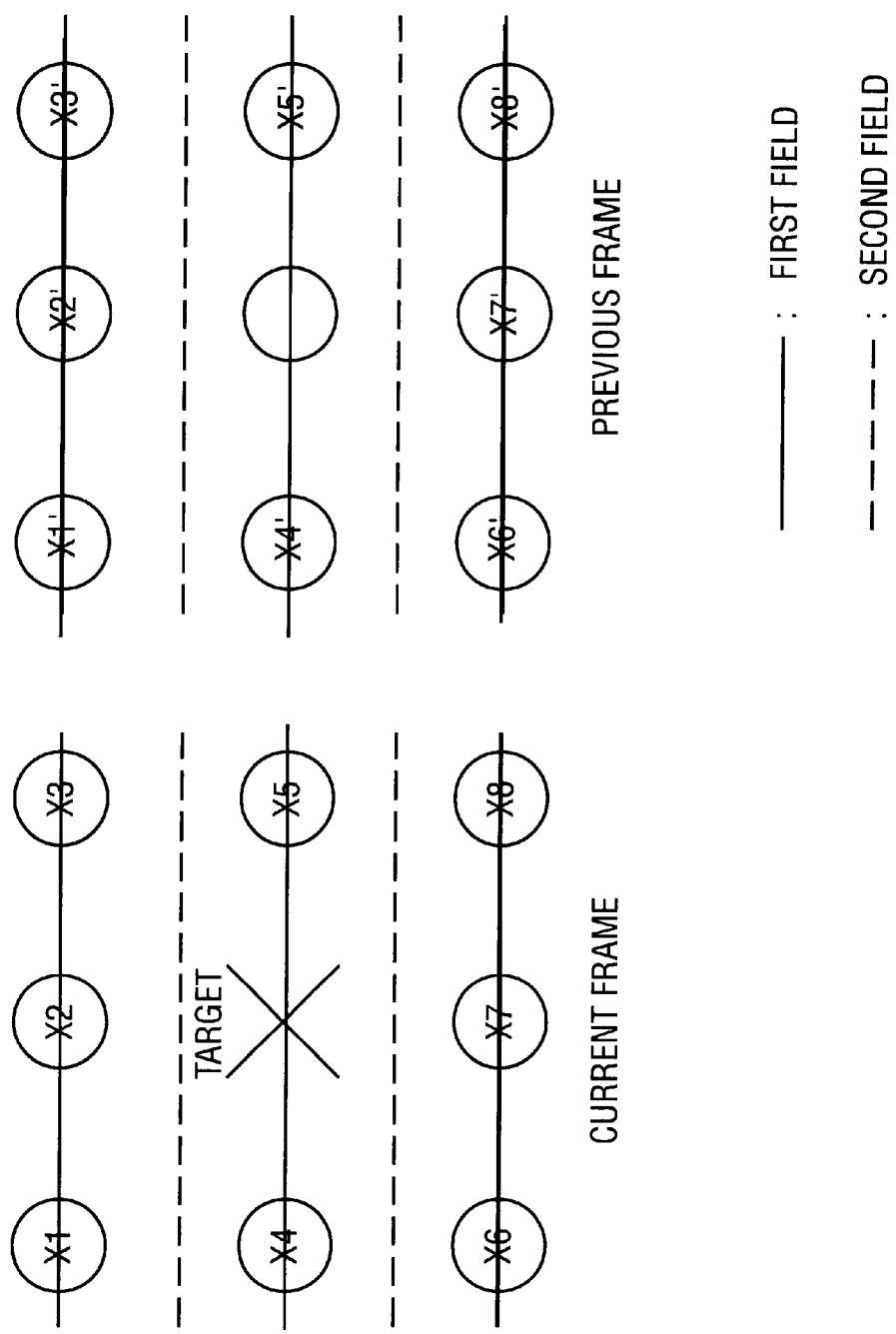
FIG. 3 : Motion Class Tap

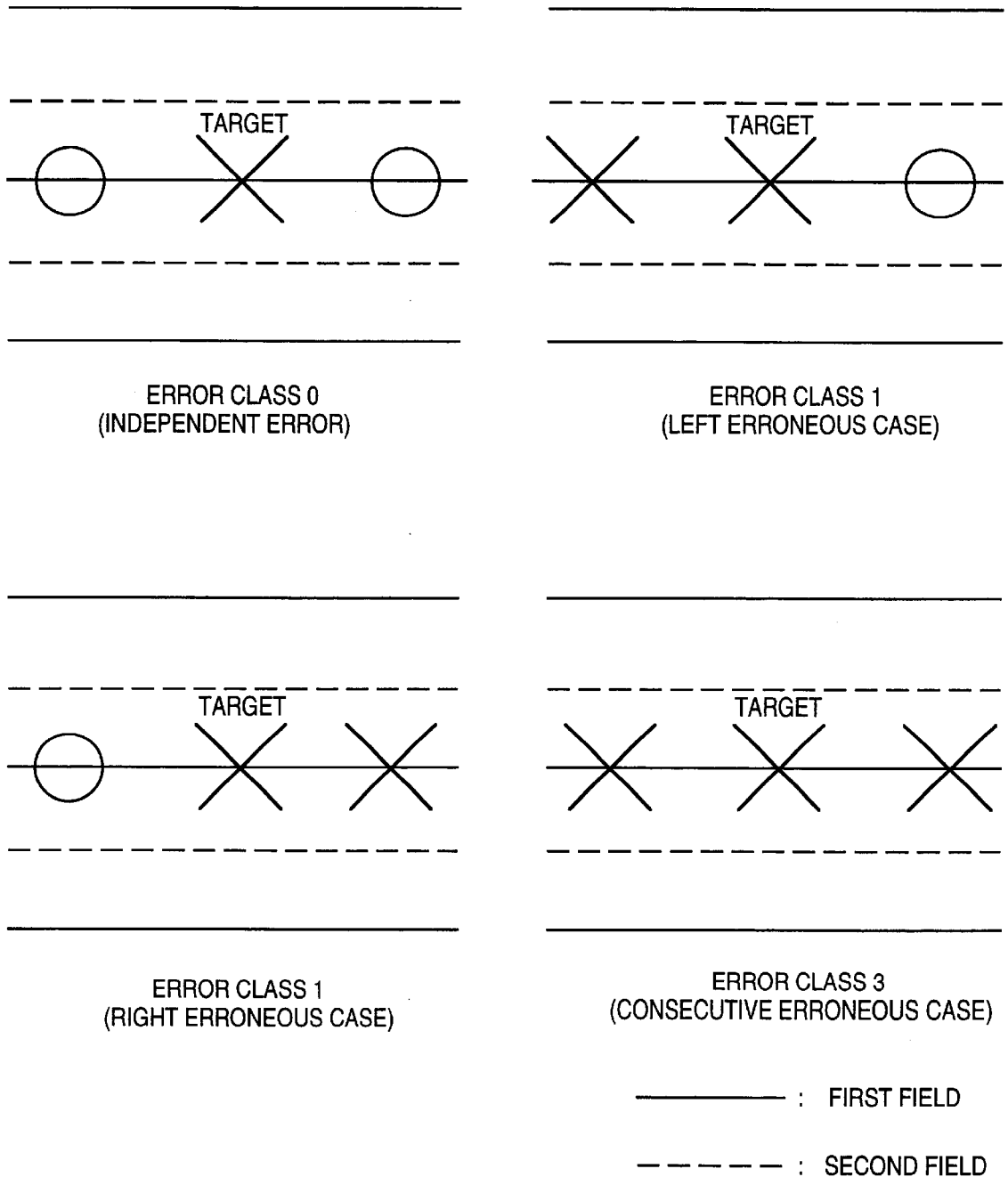
FIGURE 4 : ERROR CLASS TAP

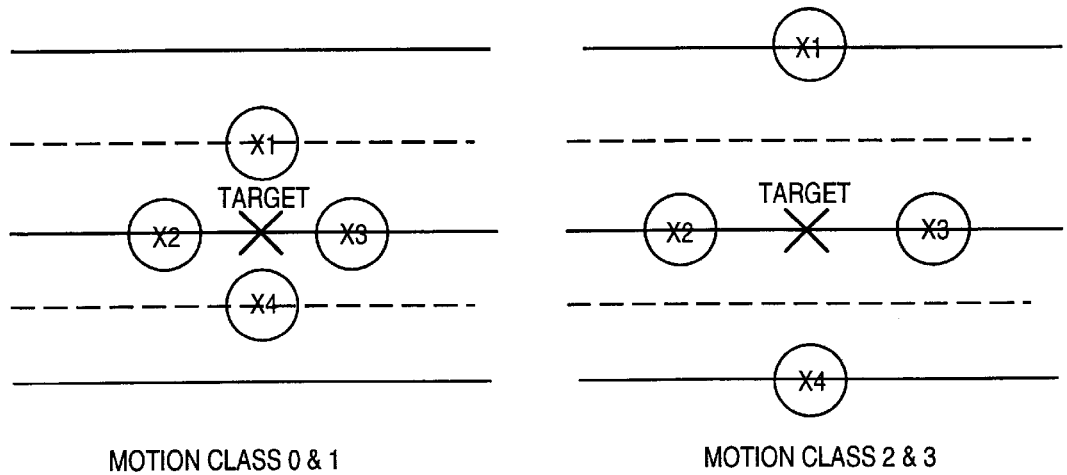
FIGURE 5 : ADAPTIVE SPATIAL CLASS TAP
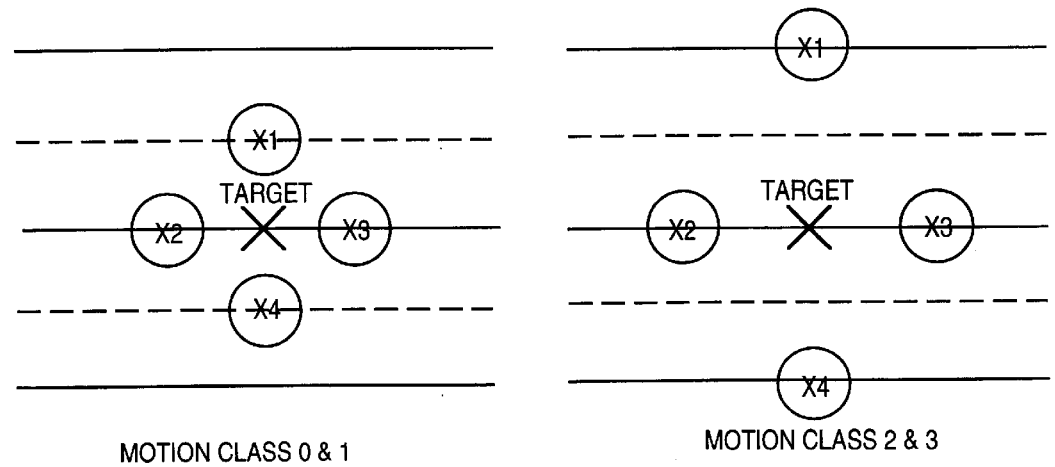
——————— : FIRST FIELD
— — — — — : SECOND FIELD
ERROR CLASS0 (INDEPENDENT ERRONEOUS CASE)
FIGURE 6 : ADAPTIVE SPATIAL CLASS TAP (ERROR CLASS0)

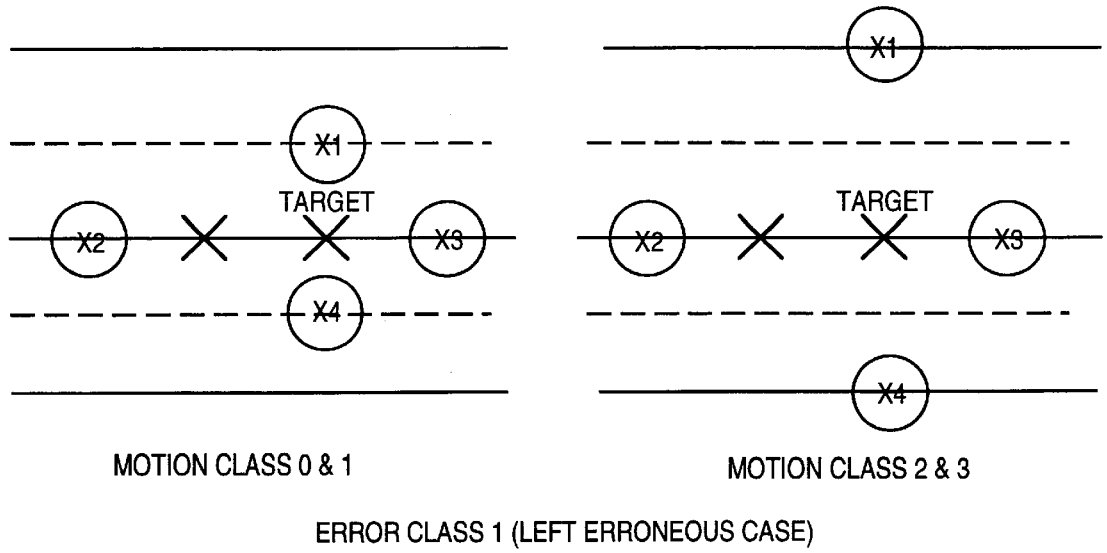
ERROR CLASS 1 (LEFT ERRONEOUS CASE)
FIGURE 7 : ADAPTIVE SPATIAL CLASS TAP (ERROR CLASS1)
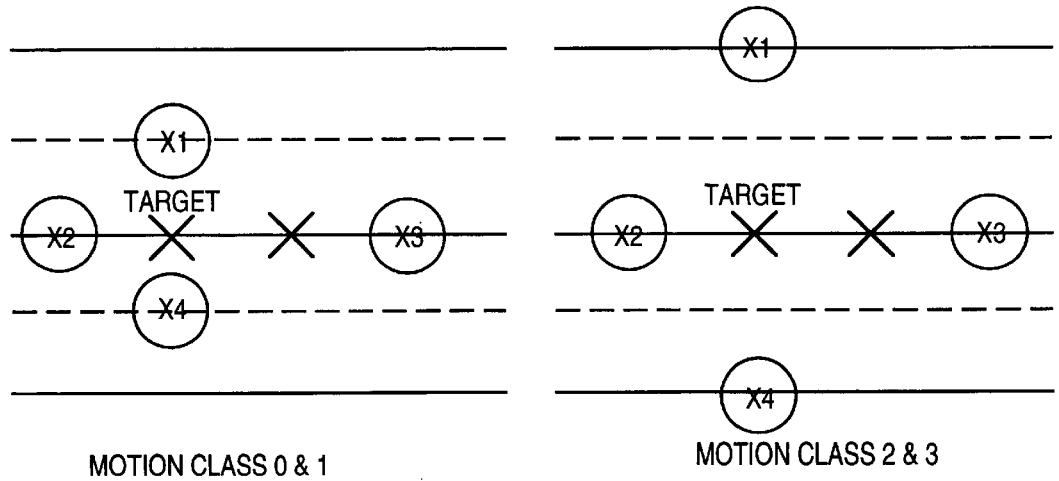
——————— : FIRST FIELD
— — — — — : SECOND FIELD
ERROR CLASS 2 (RIGHT ERRONEOUS CASE)
FIGURE 8 : ADAPTIVE SPATIAL CLASS TAP (ERROR CLASS2)

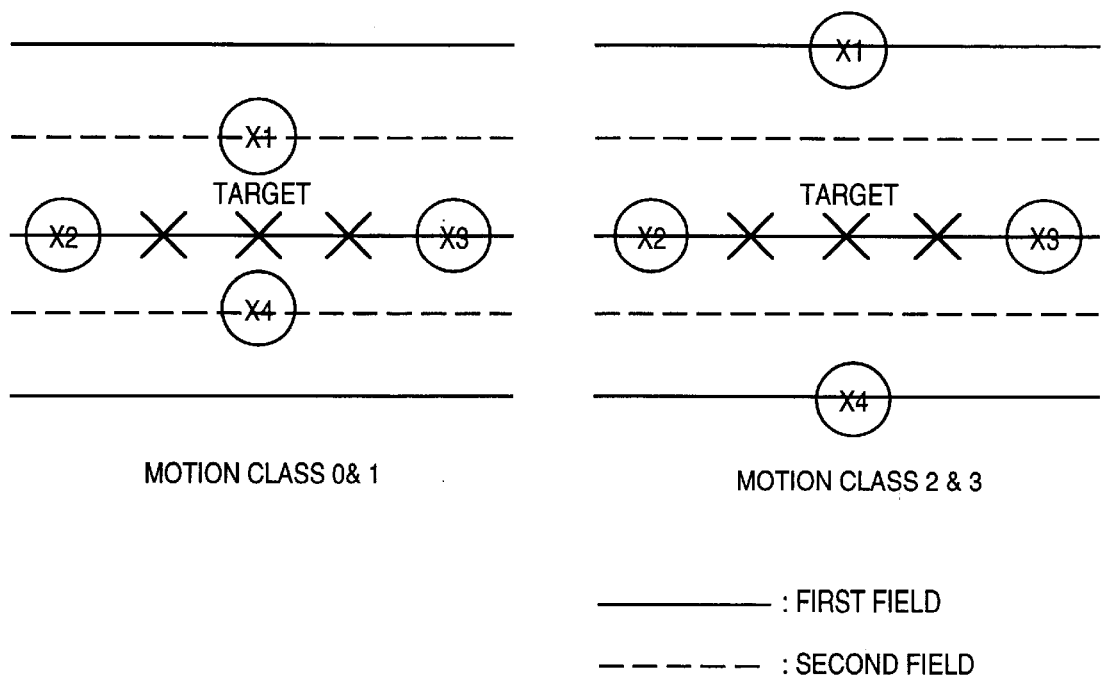
FIGURE 9 : ADAPTIVE SPATIAL CLASS TAP (ERROR CLASS3)

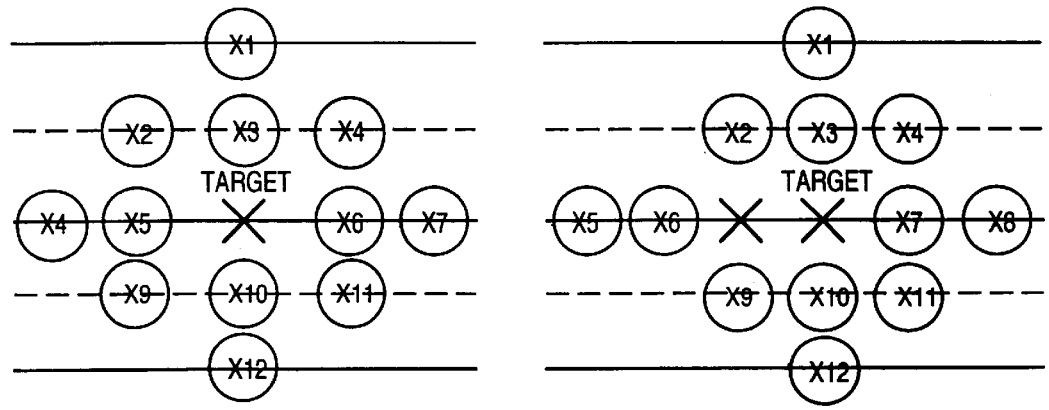
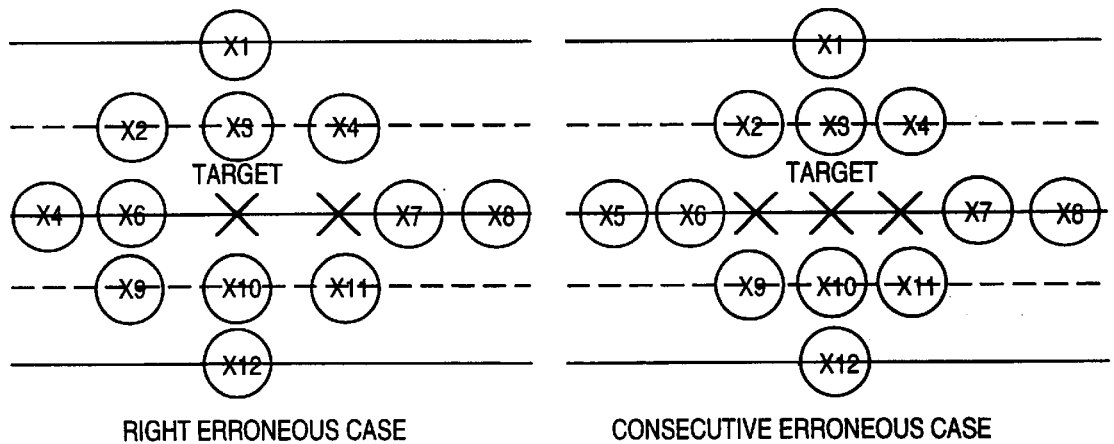
FIGURE 10 : ADAPTIVE FILTERTAP

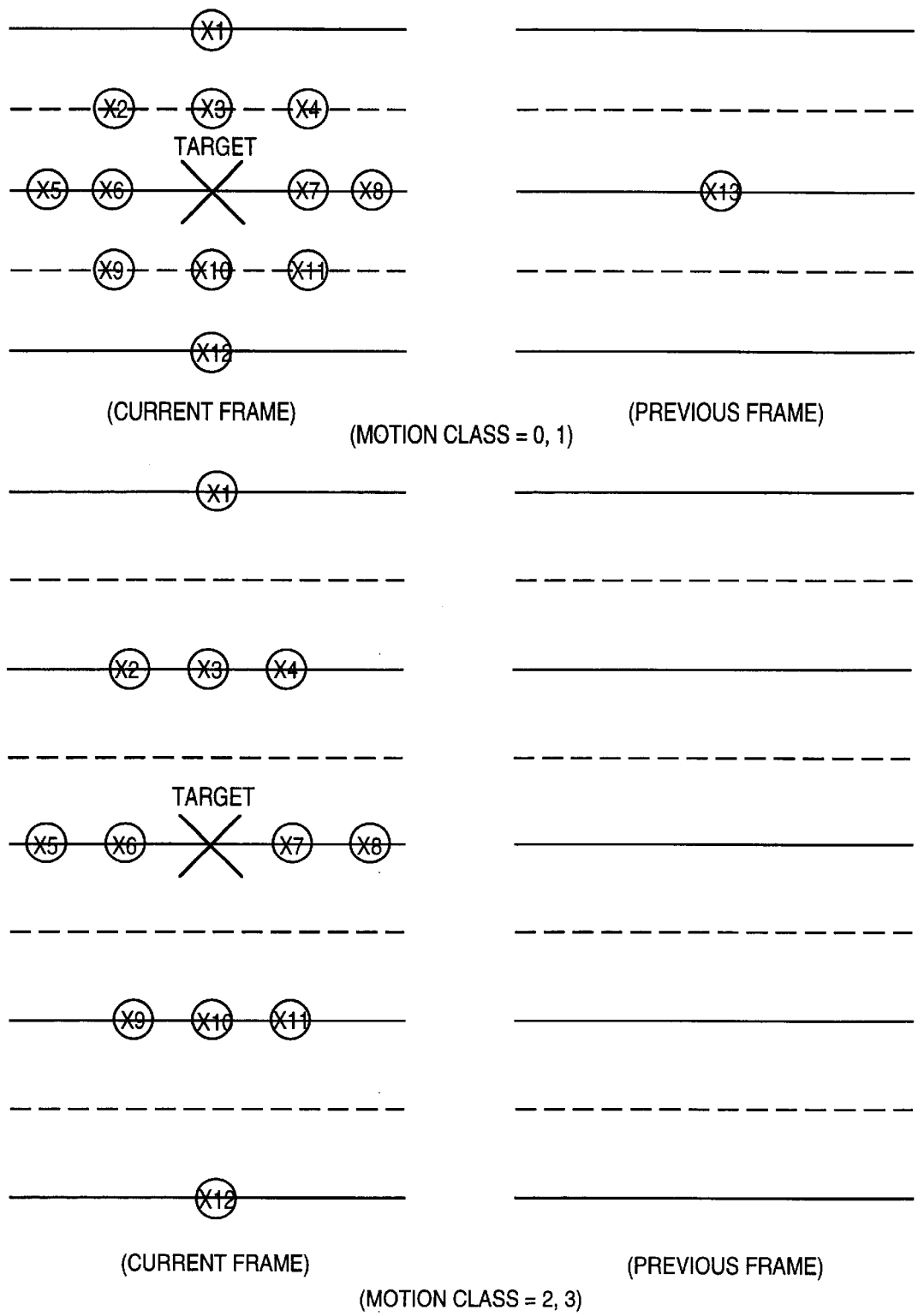
FIGURE 11 : ADAPTIVE FILTER TAP

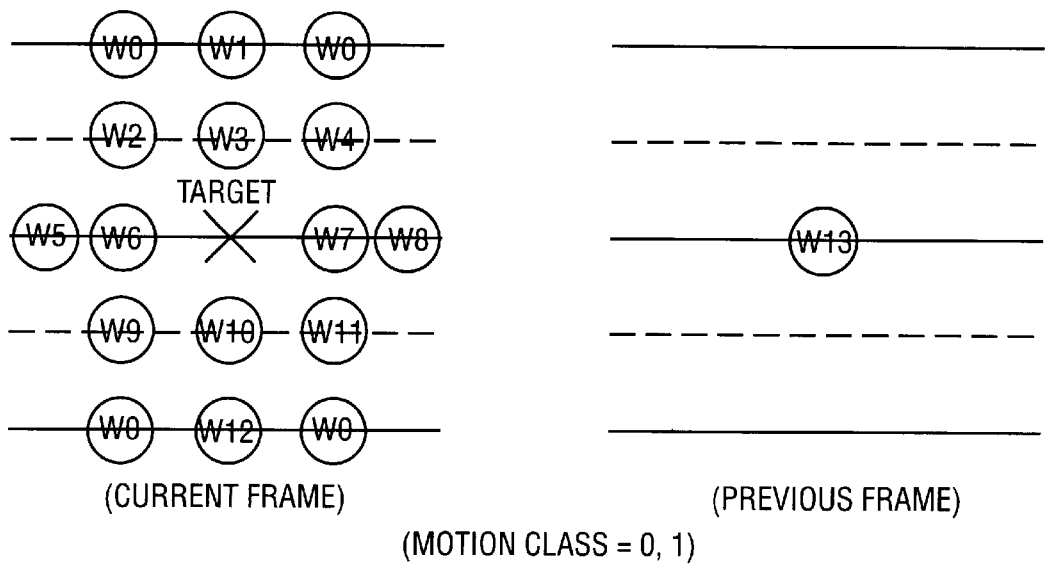
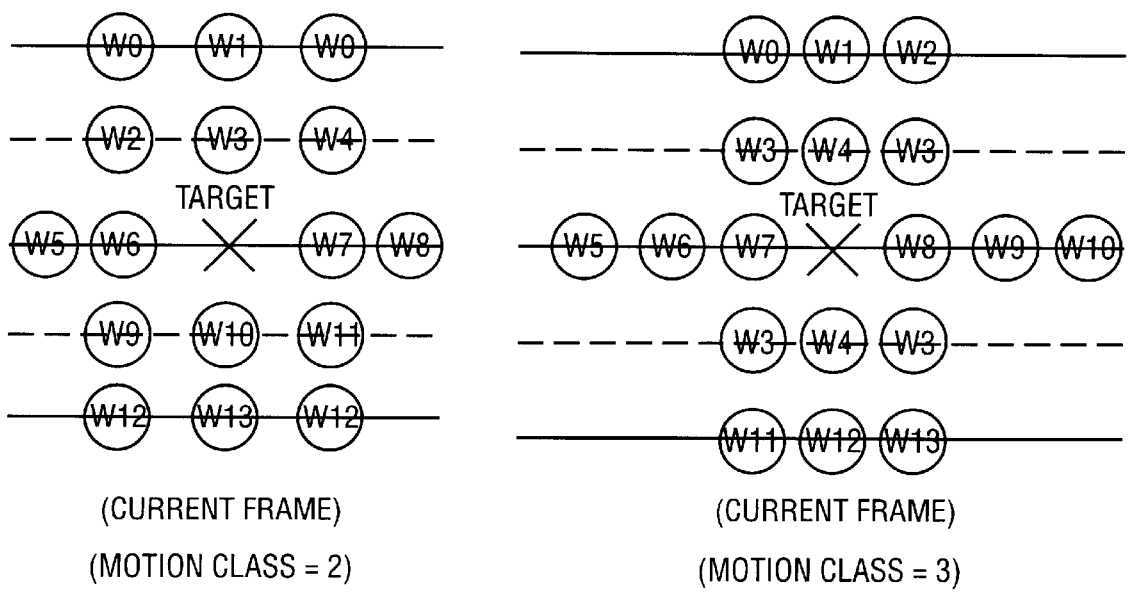
FIG. 12 : ADAPTIVE FILTER TAP (ERROR CLASS0)

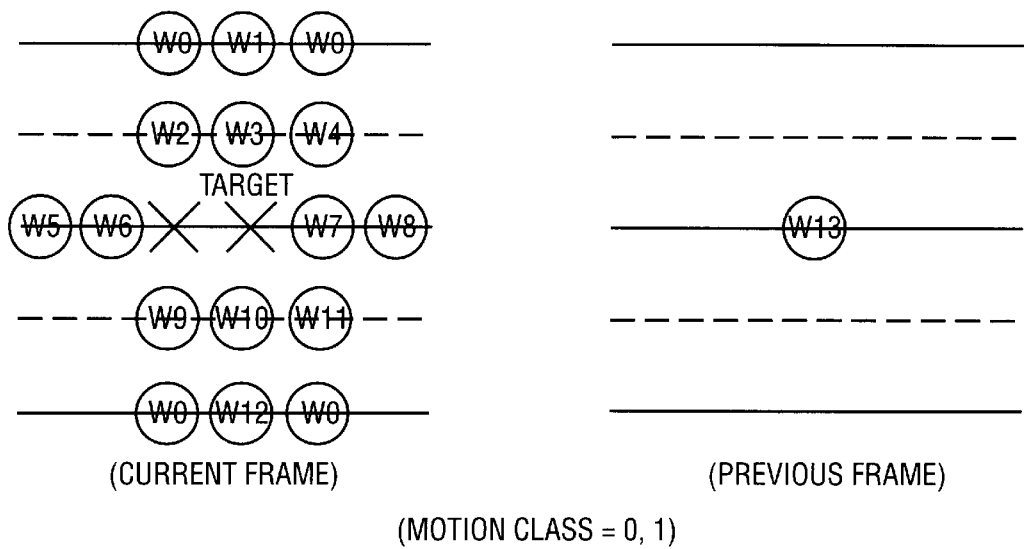
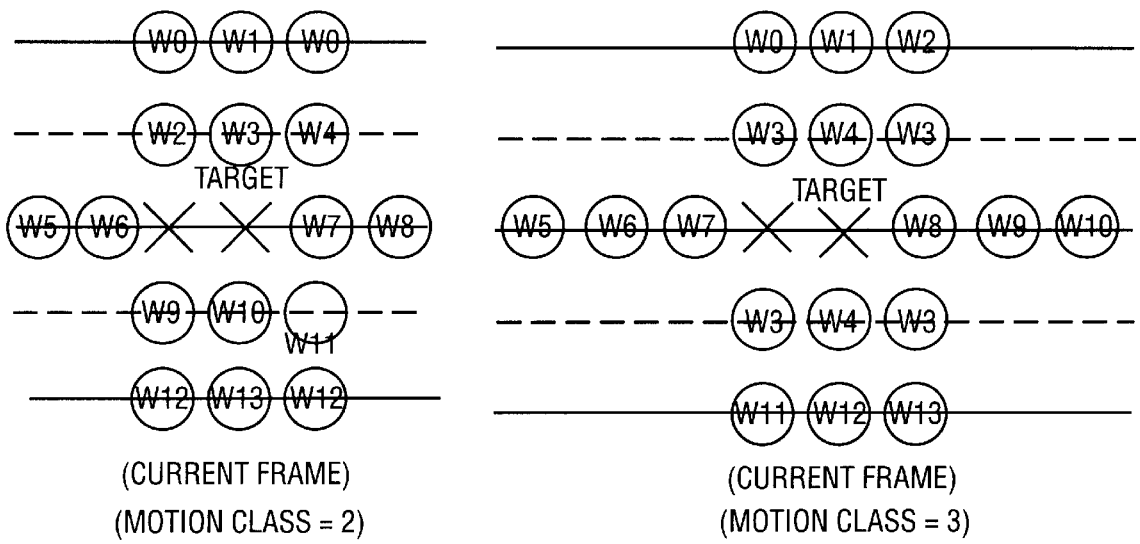
FIG. 13 : ADAPTIVE FILTER TAP (ERROR CLASS1)

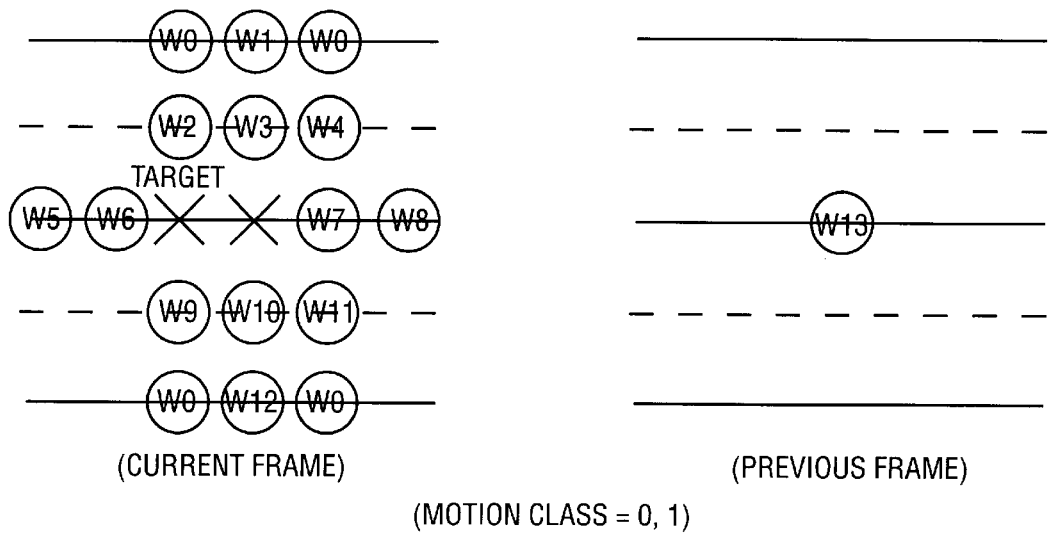
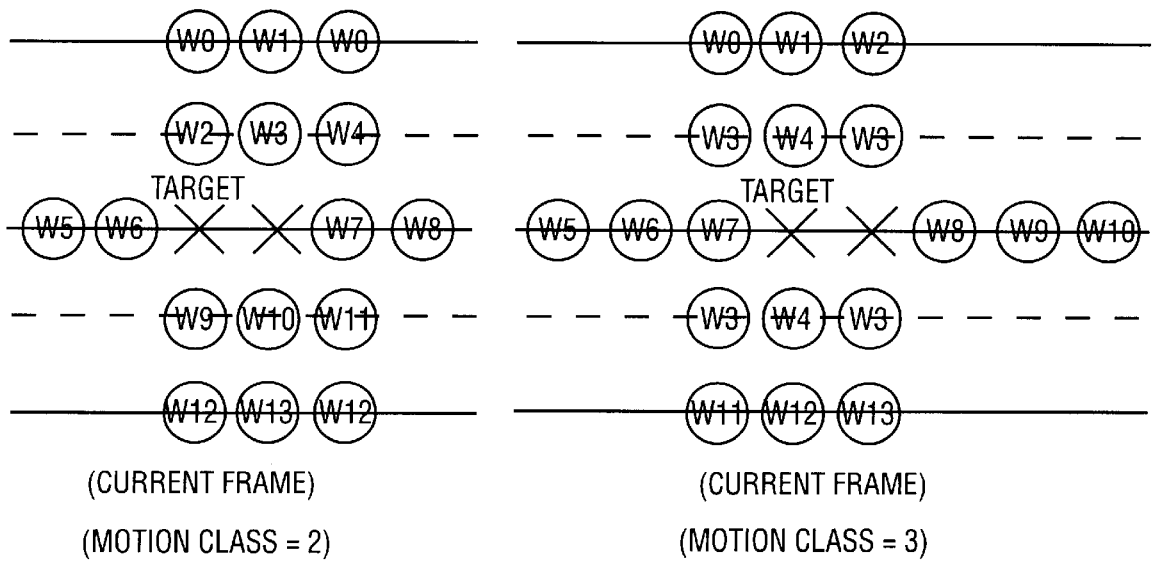
FIG. 14 : ADAPTIVE FILTER TAP (ERROR CLASS2)

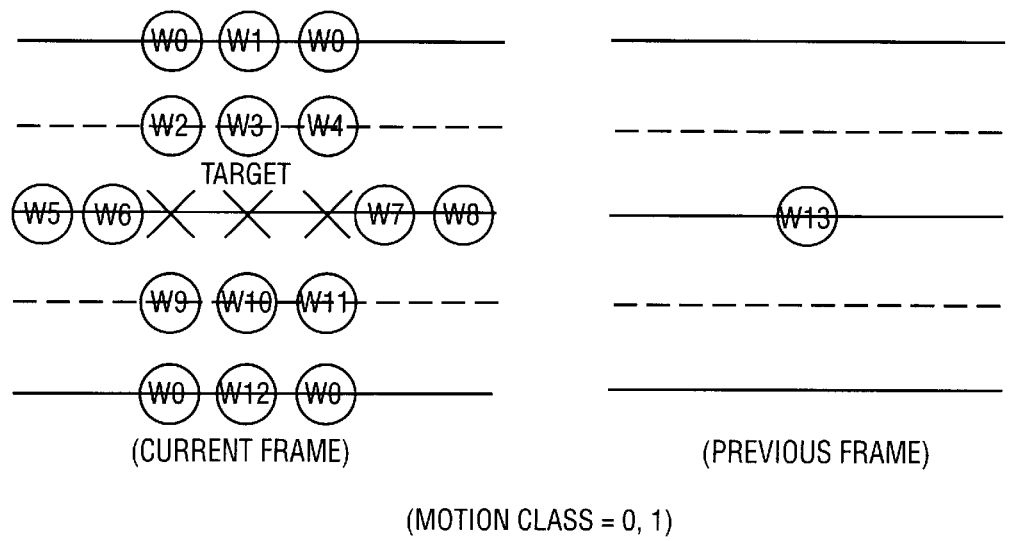
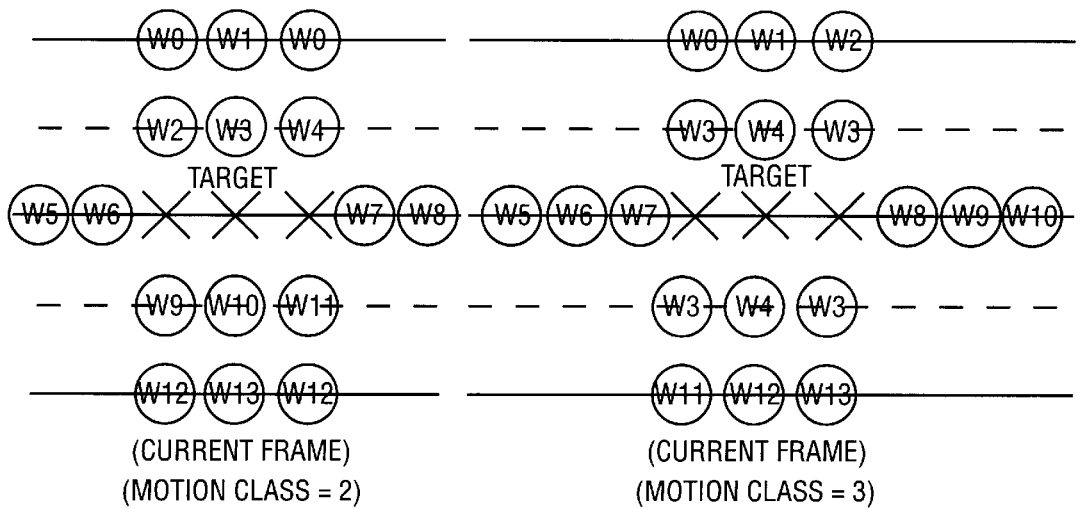
FIG. 15 : ADAPTIVE FILTER TAP (ERROR CLASS3)

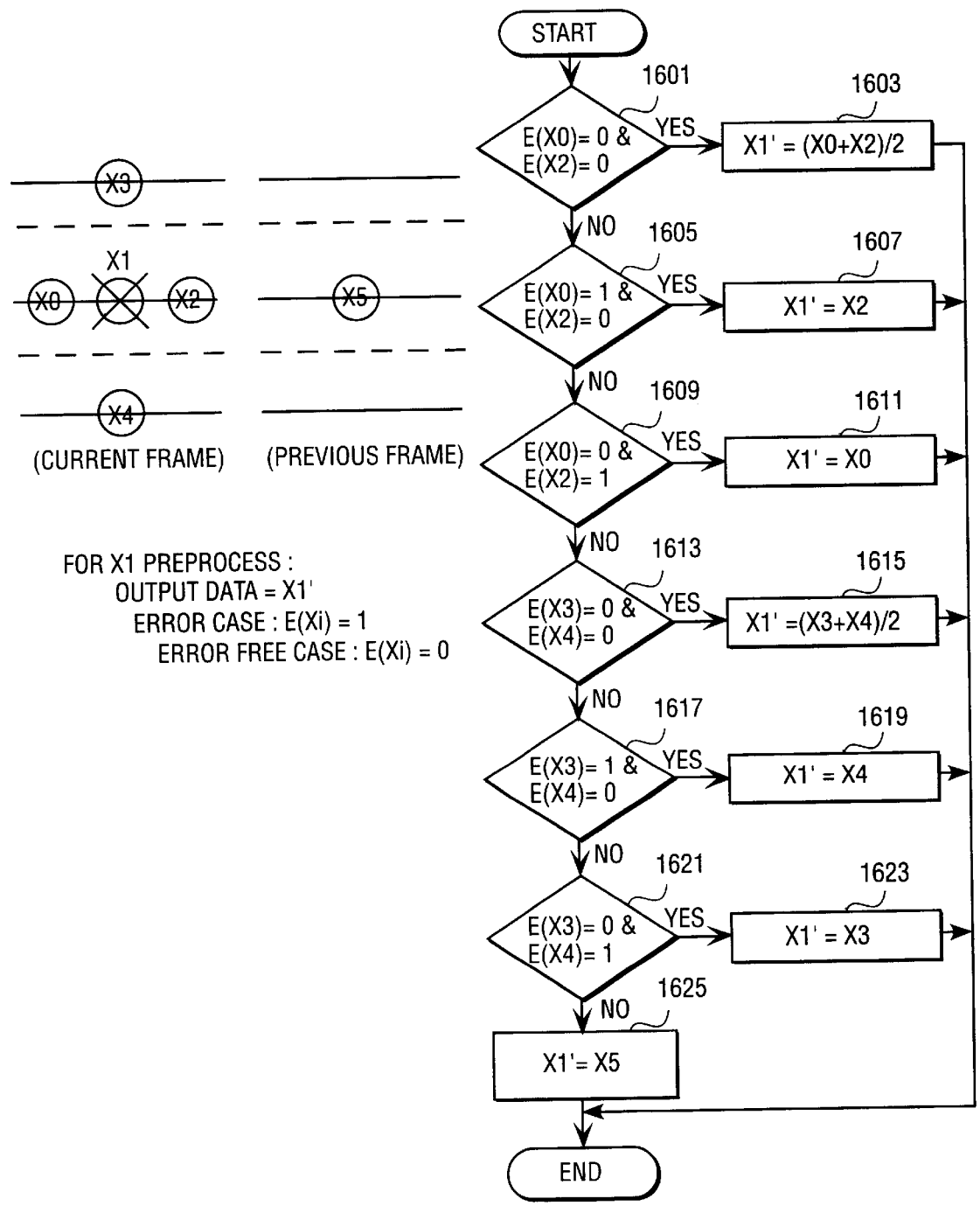
FIG. 16 : PREPROCESSING ALGORITHM

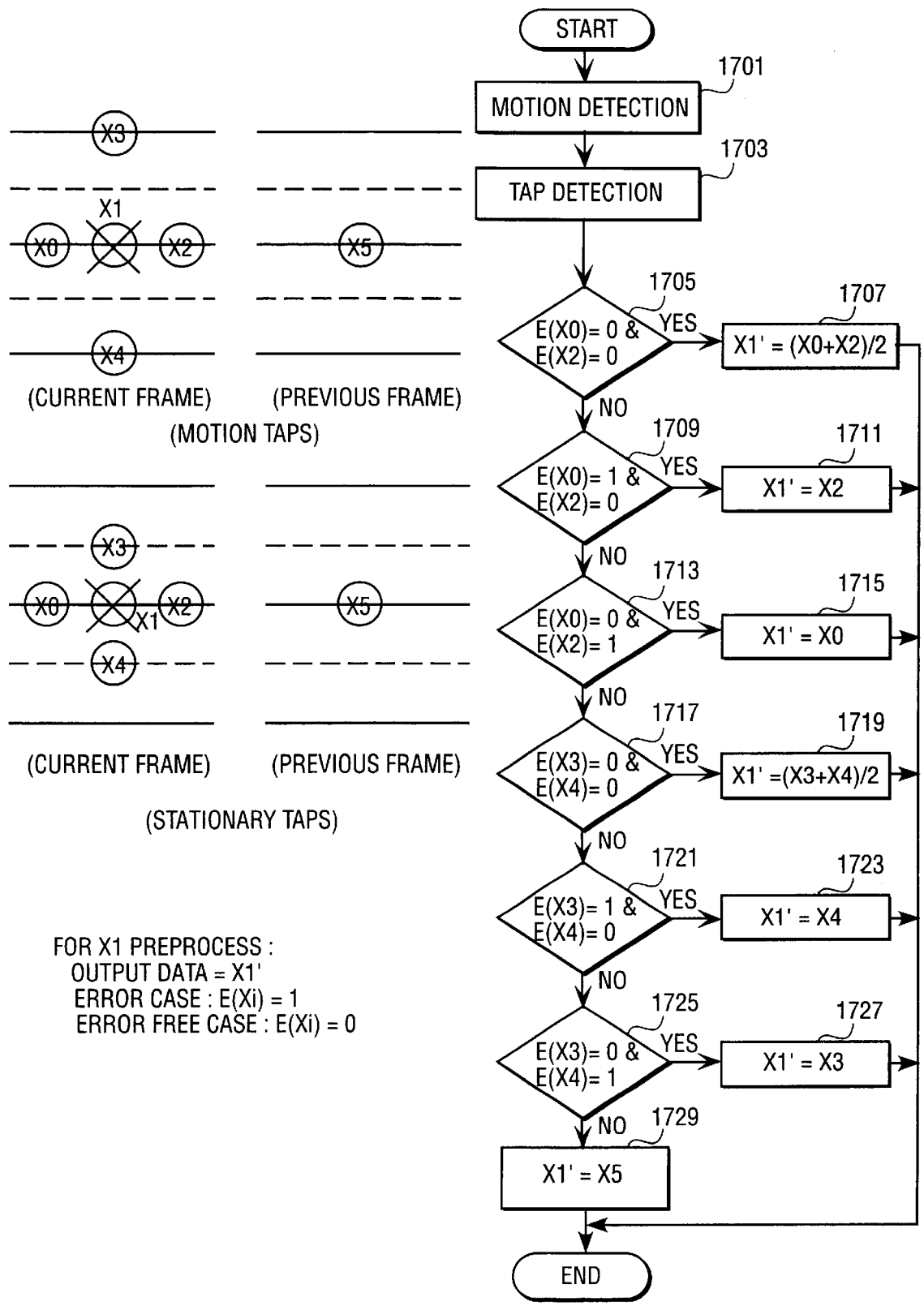
FIG. 17 : PREPROCESSING ALGORITHM

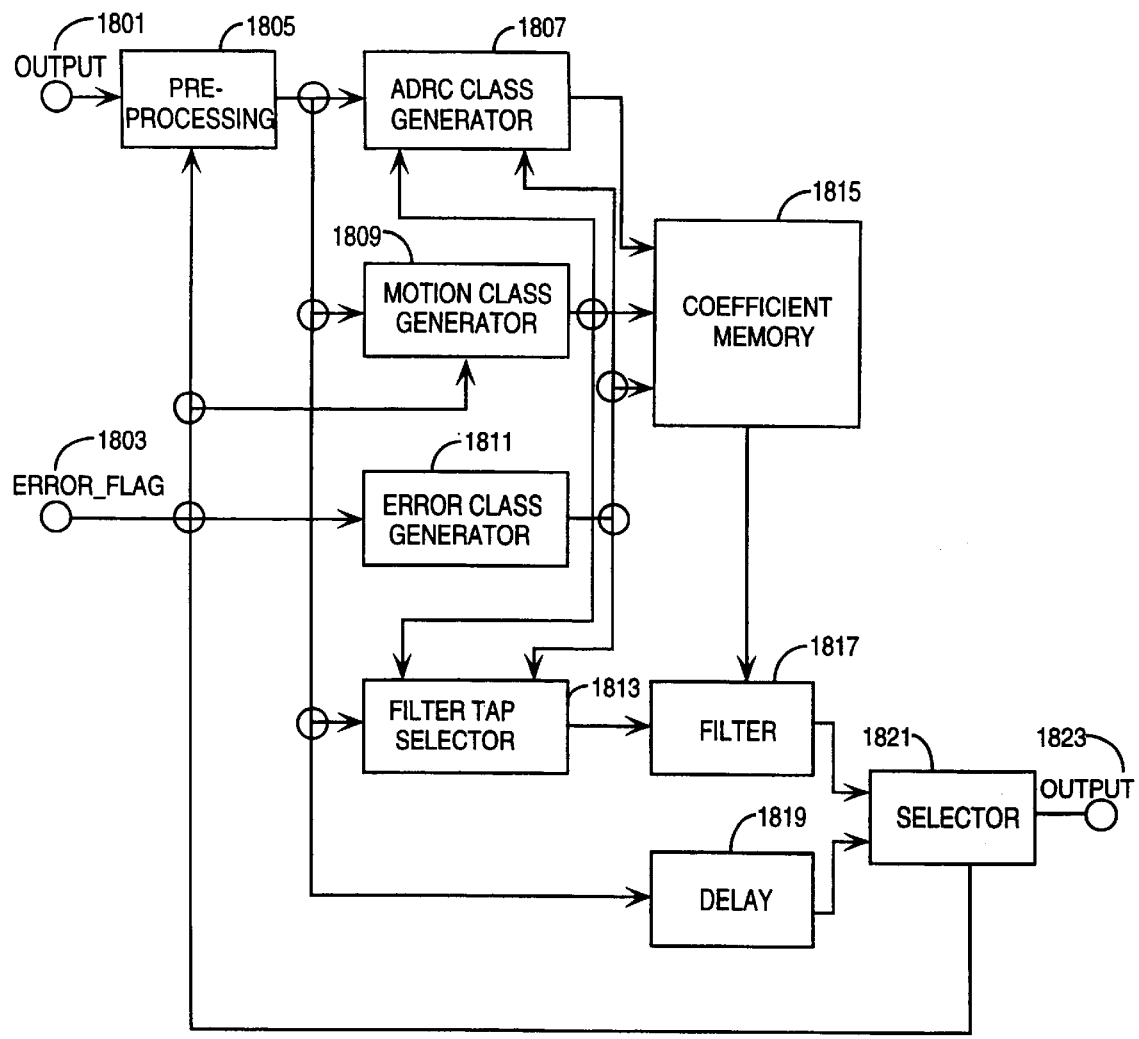
FIGURE 18 : SYSTEM BLOCK DIAGRAM

| MEMORY ADDRESS | | | MEMORY DATA |
|---|---|---|---|
| ERROR CLASS | MOTION CLASS | ADRC CLASS | FILTER COEFFICIENT |
| 0 | 0 | 0 | W0,0   W0,1 — — — — W0,12   W0,13 |
| | | ⋮ | ⋮ |
| | | 7 | W7,0   W7,1 — — — W7,12   W7,13 |
| | ⋮ | ⋮ | ⋮ |
| | 3 | 0 | W24,0   W24,1 — — — — W24,12   W24,13 |
| | | ⋮ | ⋮ |
| | | 7 | W31,0   W31,1 — — — W31,12   W31,13 |
| ⋮ | ⋮ | ⋮ | ⋮ |
| 3 | 0 | 0 | W96,0   W96,1 — — — — W96,12   W96,13 |
| | | ⋮ | ⋮ |
| | | 7 | W103,0   W103,1 — — — W103,12   W103,13 |
| | ⋮ | ⋮ | ⋮ |
| | 3 | 0 | W120,0   W120,1 — — — — W120,12   W120,13 |
| | | ⋮ | ⋮ |
| | | 7 | W127,0   W127,1 — — — — W127,12   W127,13 |

FIG. 19 :   COEFFICIENTS MEMORY CONTENTS

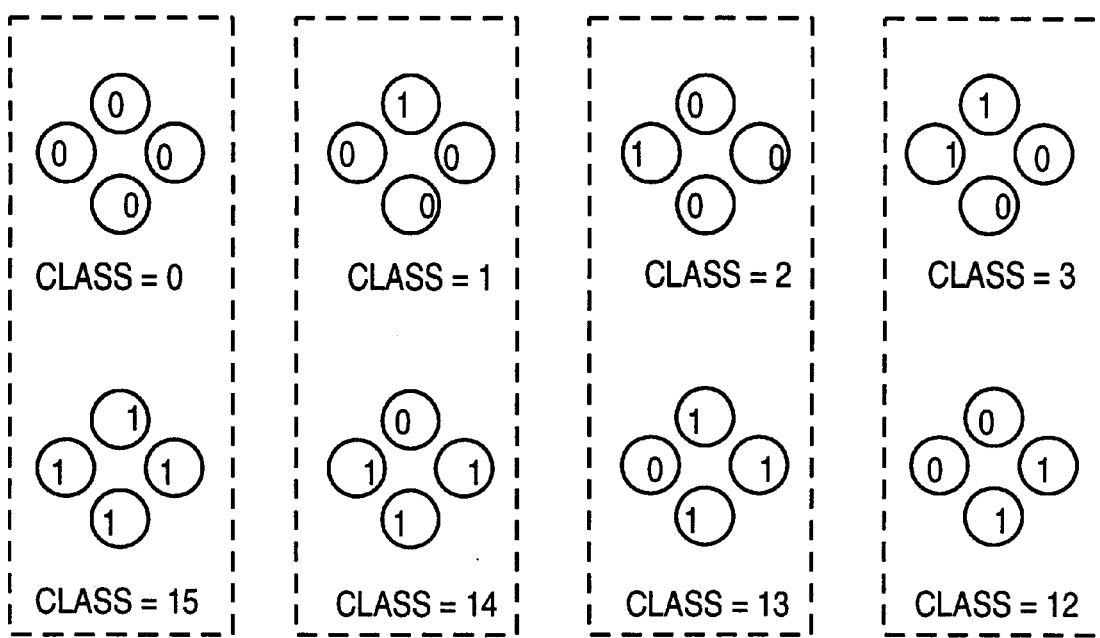
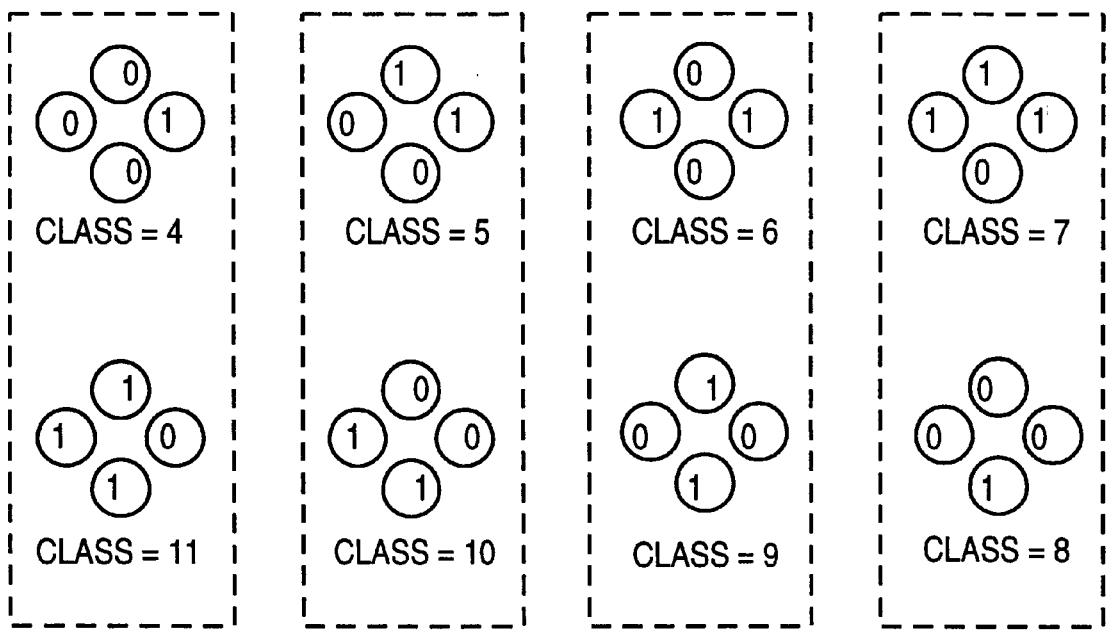
FIGURE 20 : ADRC CLASS REDUCTION

METHOD AND APPARATUS FOR SPATIAL CLASS REDUCTION

FIELD OF THE INVENTION

This invention relates generally to the processing of image, sound or other correlated signals, and more particularly, to a method, apparatus, and article of manufacture for restoring a deteriorated signal to an undeteriorated signal.

BACKGROUND OF THE INVENTION

Conventionally, to restore an image that is deteriorated in image quality it is necessary to analyze the cause of the deterioration, determine a deterioration model function, and apply its inverse function to the deteriorated image. Various causes of deteriorations are possible, such as a uniform movement of a camera (imaging device such as a video camera) and blurring caused by the optical system of a camera. Therefore, in restoring an image, different model functions may be used for respective causes of deteriorations. Unless the cause of deterioration is found, it is difficult to restore a deteriorated image because a model function cannot be determined.

In addition, it is frequently the case that even if a model function of a deterioration is established, there is no inverse function for restoration that corresponds to the model function. In such a case, it is difficult to perform evaluation for determining the optimum model.

Conventionally, error recovery has been achieved by correlation evaluation. For example, some recovery choices have been implemented using a conventional error pixel recovery method. FIG. 1A shows a conventional error recovery block diagram. Using neighboring data, which are shown in FIG. 1B, spatial inclinations of the target data are detected. In this example, the inclinations regarding four directions are evaluated according to the formulae which are shown in FIG. 1C. An interpolation filter is chosen where the inclination value, $E_i$, is the smallest among four values. In addition to the spatial inclination, a motion factor is also evaluated for error recovery. In the case of the motion area, a selected spatial filter is used for error recovery. On the other hand, the previous frame data at the same location as the target data are used for error recovery. This evaluation is performed in the evaluation block of FIG. 1A.

The conventional error recovery process shown in FIGS. 1A–1C may cause many serious degradations on changing data, especially on object edges. Actual signal distribution typically varies widely, so these problems are likely to occur. Therefore, there is a need for a way to restore a deteriorated signal to an undeteriorated signal which minimizes degradations on changing data.

SUMMARY OF THE INVENTION

The present invention provides a method, apparatus, and article of manufacture for restoring a deteriorated signal to an undeteriorated signal. A deteriorated signal consists of a plurality of deteriorated and undeteriorated data points. For each deteriorated data point, a plurality of class types is created based upon characteristics of the area containing the deteriorated data point. The data point is classified with respect to one of the plurality of class types and assigned a corresponding input signal class. The undeteriorated signal is generated by adaptive filtering of the input signal in accordance with the input signal classification results. More than one classification method may optionally be used to create the plurality of class types. Created classes may include a motion class, an error class, a spatial class or a spatial activity class. An adaptive class tap structure may optionally be used to create the plurality of class types. An adaptive filter tap structure may optionally be used base on the corresponding plurality of class types. Filter tap expansion may optionally be used to reduce the number of filter coefficients. The deteriorated input signal may optionally be modified by preprocessing peripheral erroneous data. A spatial class may optionally be modified according to spatial symmetry.

DESCRIPTION OF THE DRAWINGS

The present invention is illustrated by way of example and may be better understood by referring to the following description in conjunction with the accompanying drawings, in which like references indicate similar elements and in which:

FIGS. 1A–1C show a conventional error recovery method, filter tap, and correspondence between inclination value and interpolation filter;

FIGS. 2A–2D show a classified adaptive error recovery method and class compatible with an embodiment of the present invention;

FIG. 3 shows a motion class tap compatible with an embodiment of the present invention;

FIG. 4 shows an error class tap compatible with an embodiment of the present invention;

FIG. 5 shows an adaptive spatial class tap compatible with an embodiment of the present invention;

FIG. 6 shows an adaptive spatial class tap (error class 0) compatible with an embodiment of the present invention;

FIG. 7 shows an adaptive spatial class tap (error class 1) compatible with an embodiment of the present invention;

FIG. 8 shows an adaptive spatial class tap (error class 2) compatible with an embodiment of the present invention;

FIG. 9 shows an adaptive spatial class tap (error class 3) compatible with an embodiment of the present invention;

FIG. 10 shows an adaptive filter tap compatible with an embodiment of the present invention;

FIG. 11 shows a motion class adaptive filter tap compatible with an embodiment of the present invention;

FIG. 12 shows a motion class adaptive filter tap (error class 0) compatible with an embodiment of the present invention;

FIG. 13 shows a motion class adaptive filter tap (error class 1) compatible with an embodiment of the present invention;

FIG. 14 shows a motion class adaptive filter tap (error class 2) compatible with an embodiment of the present invention;

FIG. 15 shows a motion class adaptive filter tap (error class 3) compatible with an embodiment of the present invention;

FIG. 16 shows a preprocessing algorithm compatible with an embodiment of the present invention;

FIG. 17 shows a motion tap and stationary tap preprocessing algorithm compatible with an embodiment of the present invention;

FIG. 18 shows a system block diagram compatible with an embodiment of the present invention;

FIG. 19 shows coefficient memory contents compatible with an embodiment of the present invention;

FIG. 20 shows an Adaptive Dynamic Range Coding (ADRC) class reduction based on a 4-tap 1-bit ADRC compatible with an embodiment of the present invention.

DETAILED DESCRIPTION OF AN EMBODIMENT OF THE PRESENT INVENTION

Figure 2D:
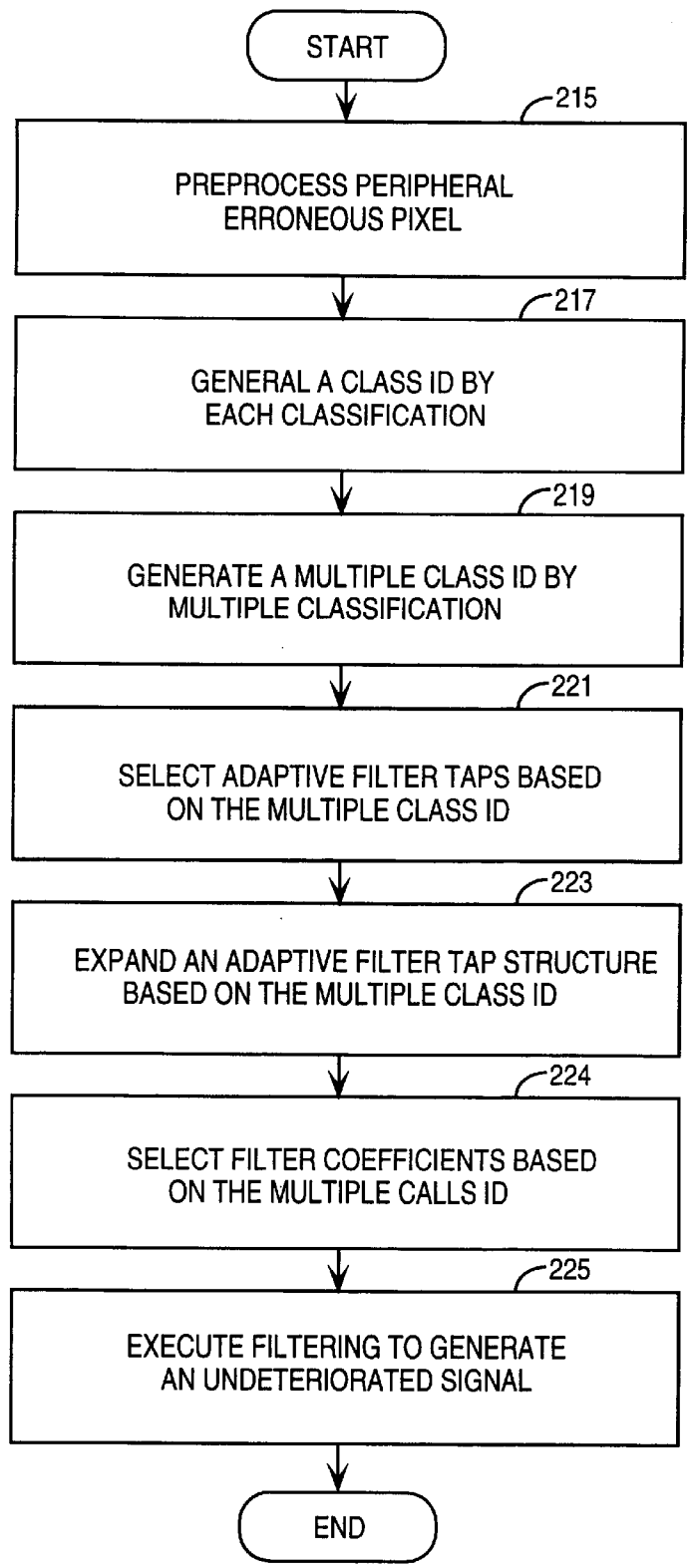

In the following description of an embodiment of the present invention, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

The present invention provides a method, apparatus, and article of manufacture for restoring a deteriorated signal to an undeteriorated signal using classified adaptive error recovery. Target data is the particular data of the deteriorated signal whose value is to be determined or estimated.

Classified adaptive error recovery is the technology which utilizes classified adaptive filter processing. A proper classification with respect to the deteriorated input signal is performed according to the input signal characteristics. An adaptive filter is prepared for each class prior to error recovery processing.

More than one classification method may optionally be used to generate the plurality of classes. Generated classes may include a motion class, an error class, a spatial activity class or a spatial class. An adaptive class tap structure may optionally be used to generate the plurality of classes. An adaptive filter tap structure may optionally be used according to the class which is detected in each deteriorated input signal. The adaptive filter tap structure may optionally be expanded based upon multiple taps. The number of filter coefficients that must be stored can be reduced by allocating the same coefficient to multiple taps. This process is referred to as filter tap expansion. The deteriorated input signal may optionally be modified by preprocessing peripheral erroneous data. A spatial class may optionally be eliminated according to a spatial class elimination formula.

The present invention can be applied to any form of correlated data, including without limitation photographs or other two-dimensional static images, holograms, or other three-dimensional static images, video or other two-dimensional moving images, three-dimensional moving images, a monaural sound stream, or sound separated into a number of spatially related streams, such as stereo. In the description, the term value, in one embodiment, may refer to a component within a set of received or generated data. Furthermore, a data point is a position, place, instance, location or range within data.

For the sake of clarity, some of the description herein focuses on video data comprising a pixel stream. However, it will be recognized that the present invention may be used with other types of data other than video data and that the terms and phrases used herein to describe the present invention cover a broad range of applications and data types. For example, an adaptive class tap structure is an adaptive structure for class tap definition used in multiple classification. A spatial class, a motion class and an error class may be used to define the structure. An adaptive filter tap structure is an adaptive structure for filter tap definition based upon a corresponding class.

A class may be defined based on one or more characteristics of the target data. For example, a class may also be defined based on one or more characteristics of the group containing the target data. A class ID is a specific value within the class that is used to describe and differentiate the target data from other data with respect to a particular characteristic. A class ID may be represented by a number, a symbol, or a code within a defined range. A parameter may be used as a predetermined or variable quantity that is used in evaluating, estimating, or classifying the data. For example, the particular motion class ID of a target data can be determined by comparing the level of motion quantity in the block containing the target data against a parameter which can be a pre-determined threshold.

Multiple Classification

In one embodiment, a multiple class may be used as a collection of specific values or sets of values used to describe at least two different characteristics of the target data. For example, a multiple class may be defined to be a combination of at least two different classes. For example, a multiple class may be defined to be a combination of an error class, a motion class, and a spatial class such as an ADRC class.

In one embodiment, the multiple class ID can be used as the memory address to locate the proper filter coefficients and other information that are to determine or estimate the value of the target data. In one embodiment, a simple concatenation of different class IDs in the multiple class ID is used as the memory address.

Therefore, a multiple classification scheme is a way of classifying the target data with respect to more than one characteristic of the target data in order to more accurately determine or estimate the value of the target data.

An error class is a collection of specific values used to describe the various distribution patterns of erroneous data in the neighborhood of the target data. In one embodiment, an error class is defined to indicate which adjacent data to the target data is erroneous. An error class ID is a specific value within the error class used to describe a particular distribution pattern of erroneous data in the neighborhood of the target data. For example, an error class ID of "0" may be defined to indicate that there is no erroneous data to the left and to the right of the target data; an error class ID of "1" may be defined to indicate that the data to the left of the target data is erroneous, etc. A filter is a mathematical process, function or mask for selecting a group of data.

A motion class is a collection of specific values used to describe the motion characteristic of the target data. In one embodiment, the motion class is defined based on the different levels of motion of the block containing the target data, for example, no motion in the block, little motion in the block, or large motion in the block. A motion class ID is a specific value within the motion class used to indicate a particular level of motion quantity of the data. For example, motion class ID of "0" may be defined to indicate no motion, motion class ID of "3" may be defined to indicate large motion.

A spatial class is a collection of specific values used to describe the spatial characteristic of the target data. For example, spatial classification of the data may be determined using Adaptive Dynamic Range Coding (ADRC), Differential Pulse Code Modulation (DPCM), Vector Quantization (VQ), Discrete Cosine Transform (DCT), etc. A spatial class ID is a specific value within the spatial class used to describe the spatial pattern of the target data in the group or block containing the target data.

For example, an ADRC class is a spatial class defined by the Adaptive Dynamic Range Coding method. An ADRC class ID is a specific value within the ADRC class used to describe the spatial pattern of the data distribution in the group or block containing the target data. A class is a collection of specific values used to describe certain characteristics of the target data. A variety of different types of classes exist, for example, a motion class, a spatial class, an error class, a spatial activity class, etc.

The present invention provides a method and apparatus for adaptive processing that generates data corresponding to a set of one or more data classes. This process is known as "classification". Classification can be achieved by various attributes of signal distribution. For example, Adaptive Dynamic Range Coding (ADRC) may be used for generation of each class as a spatial class, but it will be recognized by one of ordinary skill in the art that other classes, including a motion class, an error class, and a spatial activity class may be used with the present invention without loss of generality. A spatial activity class is a collection of specific values used to describe the spatial activity characteristic of the target data. For example, spatial activity classification of the data may be determined using the dynamic range, the standard deviation, the Laplacian value or the spatial gradient value. Some classification methods provide advantages which are desirable before restoration of a deteriorated signal takes place. For example, ADRC can achieve classification by normalizing each signal waveform automatically.

For each class, a suitable filter for signal restoration is prepared for the adaptive processing. In one embodiment, each filter is represented by a matrix of filter coefficients which are applied to the data. The filter coefficients can be generated by a training process, an example of which is described subsequently, that occurs as a preparation process prior to filtering. In one embodiment of the present invention, the filter coefficients can be stored in a random access memory (RAM), shown in FIG. 2A at 207.

A typical signal processing flow of the present invention is shown in FIG. 2A. Target input data 201 can be accompanied with error flag data 203. Error flag data can indicate locations within the data that contain erroneous pixels. In one embodiment of the present invention, an ADRC class is generated for each input target data in classification block 205, filter coefficients corresponding to each class ID are output from the coefficient memory block 207, and filtering is executed with input data 201 and the filter coefficients in the filter block 209. The filtered data may correspond to an error recovered result. In the selector block 211, switching between error recovered data and error free data occurs according to the error flag data 203.

In FIG. 2B, an example is shown where the number of class taps is four. In the case of 1-bit ADRC, 16 class IDs are available as given by [formula 3], shown below. ADRC is realized by [formula 2], shown below. Detecting a local dynamic range (DR) is given by [formula 1], shown below, $$DR = MAX - MIN + 1 \quad \text{[formula 1]}$$

$$q_i = \left\lfloor \frac{(x_i - MIN + 0.5) \cdot 2^Q}{DR} \right\rfloor \quad \text{[formula 2]}$$

$$c = \sum_{i=1}^{4} 2^{i-1} \cdot q_i \quad \text{[formula 3]}$$

where c corresponds to an ADRC class ID, DR represents the dynamic range of the four data area, MAX represents the maximum level of the four data, MIN represents the minimum level of the four data, $q_i$ is the ADRC encoded data, also referred to as a Q code, and Q is the number of quantization bits. The $\lfloor . \rfloor$ operator represents a truncation operation.

In 1-bit ADRC, c may have a value from 0 to 15 with Q=1. This process is one type of spatial classification, but it will be recognized by one of ordinary skill in the art that other examples of spatial classification, including Differential PCM, Vector Quantization and Discrete Cosine Transform may be used with the present invention without loss of generality. Any method may be used if it can classify a target data distribution.

In the example shown in FIG. 2C, each adaptive filter has 12 taps. Output data is generated according to the linear combination operation given by [formula 4], shown below, $$y = \sum_{i=1}^{12} w_i \cdot x_i \quad \text{[formula 4]}$$

where $x_i$ is input data, $w_i$ corresponds to each filter coefficient, and y is the output data after error recovery. Filter coefficients can be generated for each class ID by a training process that occurs prior to the error recovery process.

For example, training may be achieved according to the following criterion.

$$\min_{w} \|X \cdot W - Y\|_2 \quad \text{[formula 5]}$$

where X, W, and Y are, for example, the following matrices: X is the input data matrix defined by [formula 6], W is the coefficient matrix defined by [formula 7], and Y corresponds to the target data matrix defined by [formula 8].

$$X = \begin{pmatrix} x_{11} & x_{12} & \cdots & x_{1n} \\ x_{21} & x_{22} & \cdots & x_{2n} \\ \vdots & \vdots & \ddots & \vdots \\ x_{m1} & x_{m2} & \cdots & x_{mn} \end{pmatrix} \quad \text{[formula 6]}$$

$$W = \begin{pmatrix} w_1 \\ w_2 \\ \vdots \\ w_n \end{pmatrix} \quad \text{[formula 7]}$$

$$Y = \begin{pmatrix} y_1 \\ y_2 \\ \vdots \\ y_m \end{pmatrix} \quad \text{[formula 8]}$$

The coefficient $w_i$ can be obtained according to [formula 5], so that estimation errors against target, data are minimized.

In the example shown in FIG. 2C, 12 coefficients regarding each ADRC class ID are determined by the training method described above.

A flow diagram of an embodiment of the present invention is shown in FIG. 2D. The flow chart of FIG. 2D shows the basic processing stream for generating an undeteriorated signal from the deteriorated input signal. At step 215, the preprocessing for a peripheral erroneous pixel is performed. At step 217, each classification regarding the deteriorated input signal is executed to generate a class ID. Some class taps are selected adaptively according to another class ID. Multiple classification may be executed, such as motion classification, error classification, spatial activity classification and spatial classification.

The classification scheme can be defined during system design, where the classification scheme, the number of classes, and other specification are decided for the target data. The design stage may include, among others, considerations of system performance and hardware complexity.

At step 219, multiple classification generates a multiple class ID with a plurality of class IDs which are generated by various classification at step 217. At step 221, filter taps are adaptively selected according to the multiple class ID which is generated at step 219. At step 223, the filter tap structure is adaptively expanded according to the multiple class ID which is generated at step 219. The number of filter coefficients that must be stored can be reduced by allocating the same coefficient to multiple taps. This process is referred to as filter tap expansion. At step 224, filter coefficients are selected according to the multiple class ID which is generated at step 219. At step 225, filtering with respect to the deteriorated input signal is executed to generate an undeteriorated signal. Filter coefficients are selected adaptively according to the multiple class ID which is generated in step 219.

In one embodiment of the present invention, a three dimensional ADRC process may be used to realize spatio-temporal classification, because simple waveform classifications such as a two dimensional ADRC process typically cannot structurally achieve separation for general motion pictures in the class of FIG. 2B. If both stationary and motion areas are processed in the same class ID, error recovery quality is degraded because of differences in characteristics of the two areas.

In another embodiment of the present invention, motion classification, in addition to spatial classification, may also be used to provide compact definition of temporal characteristics. Further, multiple classification may be added to the classified adaptive error recovery method. For example, there are various types of classes, such as a motion class, an error class, a spatial activity class and a spatial class explained above. The combination of one or more of these different classification methods can also improve classification quality.

FIG. 3 shows an example of motion class tap structures. The example shows eight taps in neighborhood of the target error data. In this example, the eight tap accumulated temporal difference can be evaluated according to [formula 9], shown below, and is classified to four kinds of motion classes by thresholding based on [formula 10], shown below. In one embodiment of the present invention, th0 is equal to 3, the is equal to 8, and th2 is equal to 24.

$$fd = \sum_{i=1}^{8} |x_i - x'_i| \qquad \text{[formula 9]}$$

$$mc = \begin{cases} 0 & (0 \le fd < th0) \\ 1 & (th0 \le fd < th1) \\ 2 & (th1 \le fd < th2) \\ 3 & (th2 \le fd) \end{cases} \qquad \text{[formula 10]}$$

In the above formulas, fd represents an accumulated temporal difference, $x_i$ represents motion class tap data of the current frame, $x'_i$ represents the previous frame tap data corresponding to the current frame, and mc represents a motion class ID. Three thresholds, th0, th1, th2, can be used for this motion classification.

In one embodiment of the present invention, an error class can be used in conjunction with the classified adaptive error recovery method. This classification is achieved according to the erroneous data distribution pattern in neighborhood of the target data, examples of which are shown in FIG. 4. This example has four error classes: an independent error case, a left error case, a right error case, and a three consecutive error case.

Generally speaking, filter coefficients of pixels adjacent to the target data have larger weights for error recovery. The data adjacent to the error data has a significant impact on the result of error recovery. Error classes can reduce this influence by separating different characteristic areas to other classes according to the adjacent erroneous data distribution. For the example shown in FIG. 2B, ADRC classification generates 16 kinds of ADRC class IDs, where motion and error classification generate four kinds of class IDs, respectively. Thus, the number of class IDs equals 16×4×4, or 256. Classification may be realized by representing each signal characteristic. Multiple classification can define a suitable class, the class ID, regarding the erroneous target data by combining different classification characteristics.

Adaptive Class Tap Structure

In one embodiment of the present invention, an adaptive class tap structure can be used in conjunction with the classified adaptive error recovery method. FIG. 5 shows one example of motion class adaptive spatial class tap structures. Intra-frame taps can be chosen in a stationary or a slow motion area. Intra-field taps are typically used for larger motion areas. Suitable spatial classification is achieved by this adaptive processing.

For example, if intra-frame taps are used for large motion area classification, then the generated class distribution may vary widely because of low correlation, and therefore it will be difficult to represent the target data characteristics properly. An adaptive class tap structure, such as that shown in FIG. 5, is therefore effective.

Additional examples are shown in FIGS. 6, 7, 8, 9. Spatial class taps are typically selected according to a motion and an error class. In addition to the motion factor, the erroneous data distribution is taken into account for the spatial class tap definition. The neighboring erroneous data is typically not introduced to the spatial classification. By this definition, only valid data is used and the classification accuracy is improved.

Adaptive Filter Tap Structure

In one embodiment of the present invention, an adaptive filter tap structure based on a corresponding class can be used in conjunction with the classified adaptive error recovery method. FIG. 10 shows one example of an adaptive filter tap structures based on an error class. The filter tap structure regarding the target data is typically defined adaptively, preferably avoiding damaged data in neighborhood. Damaged data is not chosen for filtering.

An adaptive filter tap structure can be also defined according to motion class, an example of which is shown in FIG. 11. In the motion class example shown in FIG. 10, motion class 0 corresponds to stationary areas, but motion class 3 corresponds to large motion areas. Motion classes 1 and 2 correspond to intermediate motion areas.

For stationary or quasi-stationary class areas, intra-frame taps are used as shown in FIG. 11. At the same time, previous frame data at the target data location may be used for error recovery filtering. These areas correspond to motion class 0 and 1. For fast motion or moderate motion areas, each filter typically has an intra-field taps structure, which is also shown in FIG. 11. As shown by the example in FIG. 11, previous frame data is not introduced, and thus weakly correlated data is ignored. Filtering quality is typically improved by intra-field taps in such cases.

FIG. 12 shows an example of motion and error class adaptive filter tap structures. FIGS. 10 and 11 represent error and motion class adaptive filter taps, respectively. The example shown in FIG. 12 illustrates both adaptive structures with error class0, which is the independent error case. Upper adaptive characteristics are also shown in this example. In a manner similar to that of FIG. 12, FIG. 13 corresponds to error class 1, FIG. 14 corresponds to error class 2 and FIG. 15 corresponds to error class 3.

Filter Tap Expansion

In one embodiment of the present invention, filter tap expansion by allocating the same coefficient to plural taps can be used in conjunction with the classified adaptive error recovery method. Filter tap expansion is also shown by the structures in FIGS. 12–15. For example, the filter tap structure has four of the same coefficient taps with motion class 3 in FIG. 12. According to the evaluation results, some tap coefficients can be replaced with the same coefficient. The example shown in FIG. 12 has four W3 coefficients that are allocated at horizontally and vertically symmetric locations. By this expansion, 14 coefficients can cover 18 tap areas. This reduction method can typically reduce the need for coefficient memory and filtering hardware such as adders and multipliers. In one embodiment of the present invention, the expansion tap definition may be achieved by evaluation of coefficient distribution and visual results.

Preprocessing For Peripheral Erroneous Data

In one embodiment of the present invention, preprocessing for peripheral erroneous data can be used in conjunction with the classified adaptive error recovery method. To achieve error recovery filtering, suitable data is necessary at peripheral error locations of filter taps.

One example of this preprocessing is shown by the flow diagram of FIG. 16. If at steps 1601, 1605, or 1609 there is erroneous data at a peripheral location of the target data, at steps 1603, 1607, 1611 the erroneous data is replaced with horizontal processed data in the case of no horizontal errors. If at steps 1613, 1617, or 1621 there are three consecutive horizontal errors, at steps 1615, 1619, or 1623 vertical processing is applied for generating preprocessed data. In all erroneous cases around the intra-frame data of this example, previous frame data is introduced for error processing, at step 1625.

FIG. 17 shows another preprocessing example that uses a motion adaptive process for preprocessing. Using error free data, motion quantity is detected at the motion detection step 1701. Generally speaking, an averaged motion quantity is calculated by averaging summed motion quantity with the number of error free data at the next step. Motion or stationary taps are chosen at step 1703 according to a threshold value of the result of averaged motion quantity.

After these steps, processing steps 1705 through 1729 are performed in a manner similar to steps 1601 through 1625 of FIG. 16. The preprocessed data is generated according to these prioritized processes, and is introduced for error recovery filtering.

Spatial Class Reduction

In one embodiment of the present invention, spatial class reduction can be used in conjunction with the classified adaptive error recovery. As explained above, an ADRC class can be used for the spatial classification, given by [formula 3]. This has 16 kinds of class IDs in the definition of a 4 tap ADRC. These 16 class IDs can be reduced to eight kinds of class IDs according to [formula 11], shown below, $$c = \begin{cases} \sum_{i=1}^{4} 2^{i-1} \cdot q_i & (c < 2^3) \\ 2^4 - 1 - \sum_{i=1}^{4} 2^{i-1} \cdot q_i & (c \geq 2^3) \end{cases} \quad \text{[formula 11]}$$

where c corresponds to the ADRC class ID, $q_i$ is the quantized data and Q is the number of quantization bits based on [formula 1] and [formula 2].

In one embodiment of the present invention, [formula 11] corresponds to a 1's complement operation in binary data of the ADRC code. This is related to the symmetric characteristics of each signal waveform. Because ADRC classification is a normalization of the target signal waveform, two waveforms which have the relation of 1's complement in each ADRC code can be classified in the same class ID. ADRC class IDs can typically be halved by this reduction process. An ADRC class reduction based on a 4-tap 1-bit ADRC is shown in FIG. 20. In this example, applying [formula 11] gives eight ADRC class pairs. Each pair contains spatial symmetric patterns, and therefore the number of ADRC class IDs can be reduced by half by taking advantage of these symmetric patterns. The spatial class reduction technique can also be applied to other spatial classification techniques, including but not limited to DPCM and Block Truncation Coding (BTC).

System Structure

An overall system structure for one embodiment of the present invention, including all the processes described above, is shown in FIG. 18. Input data 1801 and corresponding error flags 1803 are input to the system. Examining the error flags 1803, the input data 1801 is preprocessed at 1805. ADRC classification is performed at 1807, motion classification is performed at 1809, and error classification is performed at 1811.

In this example, ADRC class taps are chosen adaptively according to the error and motion class, such as shown in FIGS. 6, 7,8, 9. Filter tap data are chosen at 1813 based on the error and motion class, such as shown in FIGS. 12, 13, 14, 15. Error recovery filtering is performed at 1817 with tap data and filter coefficients selected from the coefficient memory 1815 corresponding to the ADRC class ID of 1807, the motion class ID of 1809 and the error class ID of 1811. Error recovered data and error free input data 1817 are selected at 1821 according to the error flag 1803, which produces the output data 1823 of this system.

FIG. 19 shows an example of coefficient memory contents. It has 4×4×8 or 128 class IDs according to the multiple classification scheme. Four categories are used for an error class, four categories are for a motion class, and eight categories are for an ADRC class, which are typically halved according to [formula 11]. Each class corresponds to each memory address in FIG. 19. In this example, 14 coefficients are stored in each class ID address according to the filter definition, like FIGS. 12, 13, 14, 15.

Figure 21:
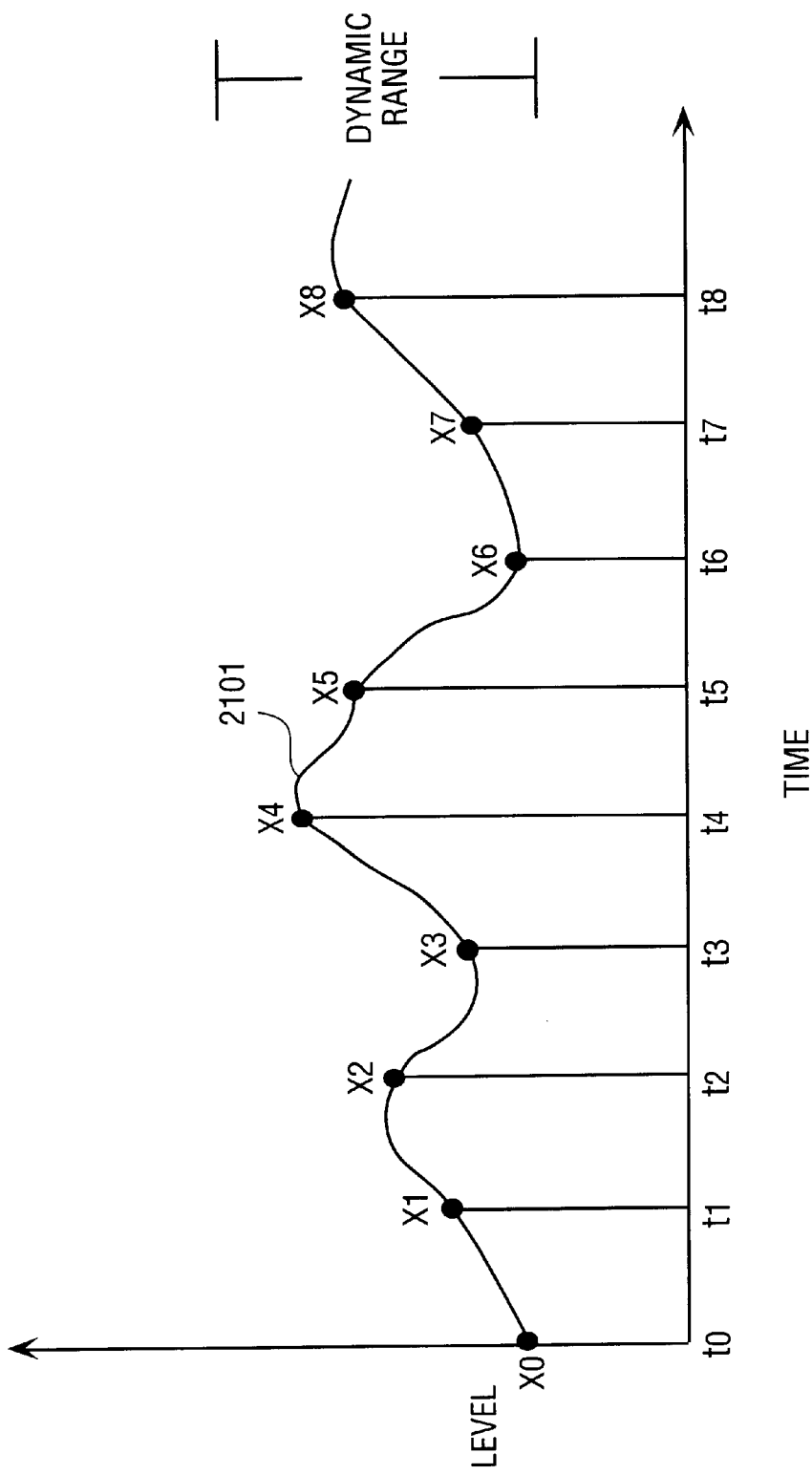
FIG. 21 shows an example of audio signal adaptive classification compatible with an embodiment of the present invention.

The present invention may be used with any form of correlated data, including without limitation photographs or other two-dimensional static images, holograms, or other three-dimensional static images, video or other two-dimensional moving images, three-dimensional moving images, a monaural sound stream, or sound separated into a number of spatially related streams, such as stereo. FIG. 21 shows an example of audio signal adaptive classification compatible with the present invention. An example audio signal 2101 is monitored at one or more time points t0–t8. The level of the audio signal 2101 at time points t0–t8 is given by tap points X0–X8. The dynamic range of the audio signal 2101 is given as the difference between the lowest level tap point X0 and the highest level tap point X4. In case of error recovery for erroneous data at t4, multiple classification can be applied with spatial classification like ADRC classification and spatial activity classification like dynamic range classification. Dynamic range classification is performed by thresholding the dynamic range in a manner similar to the motion classification processing of [formula 10]. As described above, motion classification, error classification and spatial classification are referred to in multiple classification. Spatial activity classification can also be introduced to multiple classification for general applications such as video data. In addition to dynamic range, the standard deviation, the Laplacian value or the spatial gradient value can be introduced for spatial activity classification.

With the present invention, the quality of data that is recovered due to errors is improved by introducing the disclosed technologies to the classified adaptive error recovery method. The present invention provides a way to restore a deteriorated signal to an undeteriorated signal which minimizes degradations on changing data.

While the invention is described in terms of embodiments in a specific system environment, those of ordinary skill in the art will recognize that the invention can be practiced, with modification, in other and different hardware and software environments within the spirit and scope of the appended claims.

What is claimed is:

1. A method for restoring a deteriorated input signal comprising the steps of:

detecting a data point of the deteriorated input signal;

creating a classification result based upon an area containing the data point;

modifying the classification result according to a classification characteristic;

selecting a filter coefficient according to the classification result;

creating an undeteriorated data by filtering the data with the filter coefficient; and outputting an undeteriorated signal corresponding to the input signal.

2. The method of claim 1 further comprising the step of unifying a plurality of classification results according to spatial symmetry.

3. The method of claim 1 further comprising the step of unifying a plurality of classification results according to a spatial class reduction formula.

4. The method of claim 1 further comprising the step of unifying a plurality of classification results according to a 1's complement formula.

5. The method of claim 1 further comprising the step of creating a motion class.

6. The method of claim 1 further comprising the step of creating an error class.

7. The method of claim 1 further comprising the step of creating a spatial class.

8. The method of claim 1 further comprising the step of creating a spatial activity class.

9. The method of claim 1 further comprising the step of creating an Adaptive Dynamic Range Coding (ADRC) class.

10. The method of claim 1 further comprising the step of creating a Differential Pulse Code Modulation (DPCM) class.

11. The method of claim 1 further comprising the step of creating a Vector Quantization (VQ) class.

12. The method of claim 1 further comprising the step of creating a Discrete Cosine Transform (DCT) class.

13. The method of claim 1 further comprising the step of creating a dynamic range class.

14. The method of claim 1 further comprising the step of creating a standard deviation class.

15. The method of claim 1 further comprising the step of creating a Laplacian class.

16. The method of claim 1 further comprising the step of creating a spatial gradient class.

17. A method for restoring a deteriorated input signal comprising the steps of:

detecting a data point of the deteriorated input signal;

classifying an area containing the data point with respect to a plurality of class types;

creating a multiple classification result with the plurality of class types;

modifying the multiple classification result according to a multiple classification characteristic;

selecting a filter coefficient according to the multiple classification result;

creating an undeteriorated data by filtering the data with the filter coefficient; and outputting an undeteriorated signal corresponding to the input signal.

18. The method of claim 17 further comprising the step of unifying a plurality of classification results according to spatial symmetry.

19. The method of claim 17 further comprising the step of unifying a plurality of classification results according to a spatial class reduction formula.

20. The method of claim 17 further comprising the step of unifying a plurality of classification results according to a 1's complement formula.

21. The method of claim 17 wherein the class types are selected from the group consisting of spatial class, spatial activity class, motion class, and error class.

22. The method of claim 17 further comprising the step of creating a spatial activity class.

23. The method of claim 17 further comprising the step of creating an Adaptive Dynamic Range Coding (ADRC) class.

24. The method of claim 17 further comprising the step of creating a Differential Pulse Code Modulation (DPCM) class.

25. The method of claim 17 further comprising the step of creating a Vector Quantization (VQ) class.

26. The method of claim 17 further comprising the step of creating a Discrete Cosine Transform (DCT) class.

27. The method of claim 17 further comprising the step of creating a dynamic range class.

28. The method of claim 17 further comprising the step of creating a standard deviation class.

29. The method of claim 17 further comprising the step of creating a Laplacian class.

30. The method of claim 17 further comprising the step of creating a spatial gradient class.

31. An article of manufacture for use in a computer system to restore a deteriorated input signal, the article of manufacture comprising a computer usable medium having computer readable program code means embodied in the medium, the program code means including:
- computer readable program code means embodied in the computer usable medium for causing a computer to detect a data point of the deteriorated input signal;
- computer readable program code means embodied in the computer usable medium for causing a computer to create a classification result based upon an area containing the data point;
- computer readable program code means embodied in the computer usable medium for causing a computer to modify the classification result according to a classification characteristic;
- computer readable program code means embodied in the computer usable medium for causing a computer to select a filter coefficient according to the classification result;
- computer readable program code means embodied in the computer usable medium for causing a computer to create an undeteriorated data by filtering the data with the filter coefficient; and
- computer readable program code means embodied in the computer usable medium for causing a computer to output an undeteriorated signal corresponding to the input signal.

32. The article of manufacture of claim 31 further comprising computer readable program code means embodied in the computer usable medium for causing a computer to unify a plurality of classification results according to spatial symmetry.

33. The article of manufacture of claim 31 further comprising computer readable program code means embodied in the computer usable medium for causing a computer to unify a plurality of classification results according to a spatial class reduction formula.

34. The article of manufacture of claim 31 further comprising computer readable program code means embodied in the computer usable medium for causing a computer to unify a plurality of classification results according to a 1's complement formula.

35. The article of manufacture of claim 31 further comprising computer readable program code means embodied in the computer usable medium for causing a computer to create a motion class.

36. The article of manufacture of claim 31 further comprising computer readable program code means embodied in the computer usable medium for causing a computer to create an error class.

37. The article of manufacture of claim 31 further comprising computer readable program code means embodied in the computer usable medium for causing a computer to create a spatial class.

38. The article of manufacture of claim 31 further comprising computer readable program code means embodied in the computer usable medium for causing a computer to create a spatial activity class.

39. The article of manufacture of claim 31 further comprising computer readable program code means embodied in the computer usable medium for causing a computer to create an Adaptive Dynamic Range Coding (ADRC) class.

40. The article of manufacture of claim 31 further comprising computer readable program code means embodied in the computer usable medium for causing a computer to create a Differential Pulse Code Modulation (DPCM) class.

41. The article of manufacture of claim 31 further comprising computer readable program code means embodied in the computer usable medium for causing a computer to create a Vector Quantization (VQ) class.

42. The article of manufacture of claim 31 further comprising computer readable program code means embodied in the computer usable medium for causing a computer to create a Discrete Cosine Transform (DCT) class.

43. The article of manufacture of claim 31 further comprising computer readable program code means embodied in the computer usable medium for causing a computer to create a dynamic range class.

44. The article of manufacture of claim 31 further comprising computer readable program code means embodied in the computer usable medium for causing a computer to create a standard deviation class.

45. The article of manufacture of claim 31 further comprising computer readable program code means embodied in the computer usable medium for causing a computer to create a Laplacian class.

46. The article of manufacture of claim 31 further comprising computer readable program code means embodied in the computer usable medium for causing a computer to create a spatial gradient class.

47. An article of manufacture for use in a computer system to restore a deteriorated input signal, the article of manufacture comprising a computer usable medium having computer readable program code means embodied in the medium, the program code means including:
- computer readable program code means embodied in the computer usable medium for causing a computer to detect a data point of the deteriorated input signal;
- computer readable program code means embodied in the computer usable medium for causing a computer to detect classify an area containing the data point with respect to a plurality of class types;
- computer readable program code means embodied in the computer usable medium for causing a computer to detect create a multiple classification result with the plurality of class types;
- computer readable program code means embodied in the computer usable medium for causing a computer to detect modify the multiple classification result according to a multiple classification characteristic;
- computer readable program code means embodied in the computer usable medium for causing a computer to detect select a filter coefficient according to the multiple classification result;
- computer readable program code means embodied in the computer usable medium for causing a computer to detect create an undeteriorated data by filtering the data with the filter coefficient; and
- computer readable program code means embodied in the computer usable medium for causing a computer to detect output an undeteriorated signal corresponding to the input signal.

48. The article of manufacture of claim 47 further comprising computer readable program code means embodied in the computer usable medium for causing a computer to detect unify a plurality of classification results according to spatial symmetry.

49. The article of manufacture of claim 47 further comprising computer readable program code means embodied in the computer usable medium for causing a computer to detect unify a plurality of classification results according to a spatial class reduction formula.

50. The article of manufacture of claim 47 further comprising computer readable program code means embodied in the computer usable medium for causing a computer to detect unify a plurality of classification results according to a 1's complement formula.

51. The article of manufacture of claim 47 wherein the class types are selected from the group consisting of spatial class, spatial activity class, motion class, and error class.

52. The article of manufacture of claim 47 further comprising computer readable program code means embodied in the computer usable medium for causing a computer to create a spatial activity class.

53. The article of manufacture of claim 47 further comprising computer readable program code means embodied in the computer usable medium for causing a computer to create an Adaptive Dynamic Range Coding (ADRC) class.

54. The article of manufacture of claim 47 further comprising computer readable program code means embodied in the computer usable medium for causing a computer to create a Differential Pulse Code Modulation (DPCM) class.

55. The article of manufacture of claim 47 further comprising computer readable program code means embodied in the computer usable medium for causing a computer to create a Vector Quantization (VQ) class.

56. The article of manufacture of claim 47 further comprising computer readable program code means embodied in the computer usable medium for causing a computer to create a Discrete Cosine Transform (DCT) class.

57. The article of manufacture of claim 47 further comprising computer readable program code means embodied in the computer usable medium for causing a computer to create a dynamic range class.

58. The article of manufacture of claim 47 further comprising computer readable program code means embodied in the computer usable medium for causing a computer to create a standard deviation class.

59. The article of manufacture of claim 47 further comprising computer readable program code means embodied in the computer usable medium for causing a computer to create a Laplacian class.

60. The article of manufacture of claim 47 further comprising computer readable program code means embodied in the computer usable medium for causing a computer to create a spatial gradient class.

61. An apparatus for restoring a deteriorated input signal comprising:
    a detector to detect a data point of the deteriorated input signal;
    a result generator logically coupled to the detector to create a classification result with the plurality of class types;
    a modifier logically coupled to the result generator to modify the classification result according to a classification characteristic;
    a selector logically coupled to the modifier to select a filter coefficient according to the modified classification result;
    a data restorer logically coupled to the assignor to create an undeteriorated data by filtering the data with the filter coefficient; and
    a transmitter logically coupled to the data restorer to output an undeteriorated signal corresponding to the input signal.

62. The apparatus of claim 61 further comprising a unifier to unify a plurality of classification results according to spatial symmetry.

63. The apparatus of claim 61 further comprising a unifier to unify a plurality of classification results according to a spatial class reduction formula.

64. The apparatus of claim 61 further comprising a unifier to unify a plurality of classification results according to a 1's complement formula.

65. The apparatus of claim 61 further comprising a class generator to create a motion class.

66. The apparatus of claim 61 further comprising a class generator to create an error class.

67. The apparatus of claim 61 further comprising a class generator to create a spatial class.

68. The apparatus of claim 61 further comprising a class generator to create a spatial activity class.

69. The apparatus of claim 61 further comprising a class generator to create an Adaptive Dynamic Range Coding (ADRC) class.

70. The apparatus of claim 61 further comprising a class generator to create a Differential Pulse Code Modulation (DPCM) class.

71. The apparatus of claim 61 further comprising a class generator to create a Vector Quantization (VQ) class.

72. The apparatus of claim 61 further comprising a class generator to create a Discrete Cosine Transform (DCT) class.

73. The apparatus of claim 61 further comprising a class generator to create a dynamic range class.

74. The apparatus of claim 61 further comprising a class generator to create a standard deviation class.

75. The apparatus of claim 61 further comprising a class generator to create a Laplacian class.

76. The apparatus of claim 61 further comprising a class generator to create a spatial gradient class.

77. An apparatus for restoring a deteriorated input signal comprising:
    a detector to detect a data point of the deteriorated input signal;
    a result generator logically coupled to the detector to create a multiple classification result with the plurality of class types;
    a modifier logically coupled to the result generator to modify the classification result according to a multiple classification characteristic;
    a selector logically coupled to the result generator to select a filter coefficient according to the modified multiple classification result;
    a data restorer logically coupled to the assignor to create an undeteriorated data by filtering the data with the filter coefficient; and
    a transmitter logically coupled to the data restorer to output an undeteriorated signal corresponding to the input signal.

78. The apparatus of claim 77 further comprising a unifier to unify a plurality of classification results according to spatial symmetry.

79. The apparatus of claim 77 further comprising a unifier to unify a plurality of classification results according to a spatial class reduction formula.

80. The apparatus of claim 77 further comprising a unifier to unify a plurality of classification results according to a 1's complement formula.

81. The apparatus of claim 77 wherein the class types are selected from the group consisting of spatial class, spatial activity class, motion class, and error class.

82. The apparatus of claim 77 further comprising a class generator to create a spatial activity class.

83. The apparatus of claim 77 further comprising a class generator to create an Adaptive Dynamic Range Coding (ADRC) class.

84. The apparatus of claim 77 further comprising a class generator to create a Differential Pulse Code Modulation (DPCM) class.

85. The apparatus of claim 77 further comprising a class generator to create a Vector Quantization (VQ) class.

86. The apparatus of claim 77 further comprising a class generator to create a Discrete Cosine Transform (DCT) class.

87. The apparatus of claim 77 further comprising a class generator to create a dynamic range class.

88. The apparatus of claim 77 further comprising a class generator to create a standard deviation class.

89. The apparatus of claim 77 further comprising a class generator to create a Laplacian class.

90. The apparatus of claim 77 further comprising a class generator to create a spatial gradient class.

91. An apparatus for restoring a deteriorated input signal comprising:
- means for detecting a data point of the deteriorated input signal;
- means for creating a classification result based upon an area containing the data point;
- means for modifying the classification result according to a classification characteristic;
- means for selecting a filter coefficient according to the classification result;
- means for creating an undeteriorated data by filtering the data with the filter coefficient; and
- means for outputting an undeteriorated signal corresponding to the input signal.

92. An apparatus for restoring a deteriorated input signal comprising:
- means for detecting a data point of the deteriorated input signal;
- means for classifying an area containing the data point with respect to a plurality of class types;
- means for creating a multiple classification result with the plurality of class types;
- means for modifying the multiple classification result according to a multiple classification characteristic;
- means for selecting a filter coefficient according to the multiple classification result;
- means for creating an undeteriorated data by filtering the data with the filter coefficient; and
- means for outputting an undeteriorated signal corresponding to the input signal.

* * * * *